US007588830B2

(12) United States Patent
Ahlgren et al.

(10) Patent No.: US 7,588,830 B2
(45) Date of Patent: *Sep. 15, 2009

(54) HEAT SHRINKABLE FILMS CONTAINING SINGLE SITE CATALYZED COPOLYMERS

(75) Inventors: Kelly R. Ahlgren, Greenville, SC (US); Robert Babrowicz, Spartanburg, SC (US); Solomon Bekele, Taylors, SC (US); Blaine C. Childress, Inman, SC (US); Marvin R. Havens, Greer, SC (US); Ronald D. Moffitt, Spartanburg, SC (US); Gautam P. Shah, Simpsonville, SC (US); George D. Wofford, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/370,834

(22) Filed: Feb. 21, 2003

(65) Prior Publication Data

US 2004/0009314 A1  Jan. 15, 2004

Related U.S. Application Data

(63) Continuation of application No. 08/996,367, filed on Dec. 22, 1997, and a continuation of application No. 08/962,825, filed on Nov. 3, 1997, now abandoned, which is a continuation of application No. 08/018,657, filed on Feb. 17, 1993, now abandoned, which is a continuation-in-part of application No. 07/983,017, filed on Nov. 30, 1992, now abandoned, which is a continuation-in-part of application No. 07/976,122, filed on Nov. 13, 1992, now abandoned.

(51) Int. Cl.
B32B 27/08 (2006.01)
(52) U.S. Cl. .................. 428/515; 428/516; 428/520
(58) Field of Classification Search .............. 428/515, 428/516, 520
See application file for complete search history.

(56) References Cited

U.S. PATENT DOCUMENTS

| 3,022,543 | A | 2/1962 | Baird, Jr., et al. |
| 3,161,629 | A | 12/1964 | Gorsich .................. 260/94.9 |
| 3,456,044 | A | 7/1969 | Phalke ..................... 264/25 |
| 3,555,604 | A | 1/1971 | Pahlke |
| 3,645,992 | A | 2/1972 | Elston |
| 3,899,535 | A | 8/1975 | Brown et al. |
| 3,900,635 | A | 8/1975 | Funderburk, Jr. et al. |
| 3,908,070 | A | 9/1975 | Marzolf |
| 4,064,296 | A | 12/1977 | Bornstein et al. |
| 4,302,565 | A | 11/1981 | Goeke et al. .............. 526/88 |
| 4,302,566 | A | 11/1981 | Karol et al. ............. 526/125 |
| 4,306,041 | A | 12/1981 | Cozewith et al. ........... 526/65 |
| 4,399,181 | A | 8/1983 | Yoshimura et al. |
| 4,424,243 | A | 1/1984 | Nishimoto et al. ......... 428/36 |
| 4,429,079 | A | 1/1984 | Shibata et al. ........... 525/240 |
| 4,456,646 | A | 6/1984 | Nishimoto et al. ........ 428/216 |
| 4,457,960 | A | 7/1984 | Newsome .................. 428/35 |
| 4,469,752 | A | 9/1984 | Yoshimura et al. |
| 4,469,753 | A | 9/1984 | Yoshimura et al. ....... 428/475.8 |
| 4,500,682 | A | 2/1985 | Chiba et al. |
| 4,501,634 | A | 2/1985 | Yoshimura et al. ..... 156/244.24 |
| 4,532,189 | A | 7/1985 | Mueller .................. 428/516 |
| 4,540,753 | A | 9/1985 | Cozewith et al. ........... 526/88 |
| 4,551,380 | A | 11/1985 | Schoenberg .............. 428/218 |
| 4,563,512 | A | 1/1986 | Goodall |
| 4,615,922 | A | 10/1986 | Newsome et al. .......... 428/35 |
| 4,640,856 | A | 2/1987 | Ferguson et al. .......... 428/36 |
| 4,643,945 | A | 2/1987 | Kiang |
| 4,647,483 | A | 3/1987 | Tse et al. |
| 4,683,170 | A | 7/1987 | Tse et al. |
| 4,701,432 | A | 10/1987 | Welborn, Jr. ............ 502/113 |
| 4,755,403 | A | 7/1988 | Ferguson .................. 428/35 |
| 4,777,095 | A | 10/1988 | Kondo et al. .......... 428/476.1 |
| 4,820,557 | A | 4/1989 | Warren |
| 4,833,024 | A | 5/1989 | Mueller .................. 428/349 |
| 4,837,084 | A | 6/1989 | Warren .................. 428/349 |
| 4,863,768 | A | 9/1989 | Ishio et al. |
| 4,863,769 | A | 9/1989 | Lustig et al. ............ 428/34.9 |
| 4,865,902 | A | 9/1989 | Golike et al. ............ 428/215 |

(Continued)

FOREIGN PATENT DOCUMENTS

AU  676047  2/1997

(Continued)

OTHER PUBLICATIONS

"Products from Exxpol(tm) Technology" Exact(tm)polymer, Exxon Product Publications 1992.*

(Continued)

Primary Examiner—Sheeba Ahmed
(74) Attorney, Agent, or Firm—Rupert B. Hurley, Jr.

(57) ABSTRACT

The present invention is directed to a heat-shrinkable, thermoplastic film or bag which contains at least one homogeneous ethylene alpha-olefin copolymer having a density of at least 0.90 g/cc. Oriented films made in accordance with the present invention exhibit improved optics and improved impact resistance. A homogeneous ethylene alpha-olefin may be present in a monolayer film either alone or in a blend or may be included in one or more layers of a multilayer film in accordance with the present invention.

12 Claims, No Drawings

U.S. PATENT DOCUMENTS

| | | | |
|---|---|---|---|
| 4,871,705 A | 10/1989 | Hoel | 502/117 |
| 4,909,881 A | 3/1990 | Garland | 156/229 |
| 4,935,397 A | 6/1990 | Chang | 502/117 |
| 4,976,898 A | 12/1990 | Lustig et al. | 264/22 |
| 4,985,188 A | 1/1991 | Ishio et al. | |
| 5,001,016 A | 3/1991 | Kondo et al. | 428/516 |
| 5,004,647 A | 4/1991 | Shah | |
| 5,023,143 A | 6/1991 | Nelson | 428/516 |
| 5,032,463 A | 7/1991 | Smith | 428/520 |
| 5,041,316 A | 8/1991 | Parnell et al. | |
| 5,055,438 A | 10/1991 | Canich | 502/117 |
| 5,057,475 A | 10/1991 | Canich et al. | 502/104 |
| 5,059,481 A | 10/1991 | Lustig et al. | 428/39.9 |
| 5,064,797 A | 11/1991 | Stricklen | 502/111 |
| 5,064,802 A | 11/1991 | Stevens et al. | 502/155 |
| 5,084,534 A | 1/1992 | Welborn, Jr. et al. | 526/160 |
| 5,088,228 A | 2/1992 | Waldie, Jr. | 43/43.12 |
| 5,089,321 A | 2/1992 | Chum et al. | |
| 5,132,074 A | 7/1992 | Isozaki et al. | 264/564 |
| 5,132,380 A | 7/1992 | Stevens et al. | 526/126 |
| 5,145,950 A | 9/1992 | Funaki et al. | |
| 5,206,075 A | 4/1993 | Hodgson, Jr. | 428/216 |
| 5,241,031 A | 8/1993 | Mehta | 526/348.1 |
| 5,256,351 A | 10/1993 | Lustig et al. | 264/22 |
| 5,266,392 A | 11/1993 | Land et al. | 428/224 |
| 5,272,016 A | 12/1993 | Ralph | 428/516 |
| 5,272,236 A | 12/1993 | Lai et al. | 526/348.5 |
| 5,278,272 A | 1/1994 | Lai et al. | 526/348.5 |
| 5,279,872 A | 1/1994 | Ralph | 428/34.9 |
| 5,283,128 A * | 2/1994 | Wilhoit | 428/516 |
| 5,290,635 A | 3/1994 | Matsumura et al. | |
| 5,298,326 A | 3/1994 | Norpoth et al. | |
| 5,302,402 A | 4/1994 | Dudenoeffer et al. | 426/129 |
| 5,358,792 A | 10/1994 | Mehta | 428/516 |
| 5,374,459 A | 12/1994 | Mumpower | 428/36.7 |
| 5,376,394 A | 12/1994 | Dudenhoeffer et al. | 426/415 |
| 5,376,439 A | 12/1994 | Hodgson et al. | 428/220 |
| 5,397,613 A | 3/1995 | Georgelos | 428/36.7 |
| 5,397,640 A | 3/1995 | Georgelos et al. | 428/349 |
| 5,403,668 A | 4/1995 | Wilhoit | 428/500 |
| 5,427,807 A | 6/1995 | Chum et al. | 426/393 |
| 5,472,791 A | 12/1995 | Landoni | 428/516 |
| 5,491,019 A | 2/1996 | Kuo | 428/213 |
| RE35,285 E | 6/1996 | Quacquarella et al. | 428/34.9 |
| 5,530,065 A | 6/1996 | Farley et al. | 525/240 |
| 5,562,958 A | 10/1996 | Walton et al. | 428/34.9 |
| 5,604,043 A | 2/1997 | Ahlgren | 428/518 |
| 5,677,383 A | 10/1997 | Chum et al. | 525/240 |
| 5,707,751 A | 1/1998 | Garza et al. | 428/515 |
| 5,834,077 A | 11/1998 | Babrowicz | 428/34.9 |
| 5,837,335 A | 11/1998 | Babrowicz | 428/34.9 |
| 5,852,152 A | 12/1998 | Walton et al. | |
| 6,074,715 A | 6/2000 | Lind et al. | 428/35.4 |
| 6,270,867 B1 | 8/2001 | Eckstein et al. | 428/35.7 |
| 6,306,969 B1 | 10/2001 | Patel et al. | |
| 6,437,064 B1* | 8/2002 | Eckstein et al. | 526/160 |
| 6,511,568 B1 | 1/2003 | Eckstein et al. | 156/216 |
| 6,514,583 B1* | 2/2003 | Ahlgren et al. | 428/34.9 |
| 6,531,198 B2 | 3/2003 | Lind et al. | 428/34.9 |
| 6,544,660 B1 | 4/2003 | Lind et al. | 428/516 |
| 2003/0027008 A1 | 2/2003 | Eckstein et al. | 428/516 |
| 2004/0009314 A1* | 1/2004 | Ahlgren et al. | 428/34.9 |

FOREIGN PATENT DOCUMENTS

| | | |
|---|---|---|
| AU | 681116 | 8/1997 |
| AU | 87015/98 | 12/1998 |
| AU | 701139 | 1/1999 |
| AU | 714055 | 12/1999 |
| DE | 3035474 A1 | 4/1982 |
| EP | 0 057 238 | 8/1982 |
| EP | 0057891 | 8/1982 |
| EP | 0120503 | 3/1984 |
| EP | 0107854 B2 | 5/1984 |
| EP | 0120503 A1 | 10/1984 |
| EP | 0051480 | 1/1985 |
| EP | 0 141 555 | 5/1985 |
| EP | 0141555 A1 | 5/1985 |
| EP | 0151462 | 8/1985 |
| EP | 0170385 | 2/1986 |
| EP | 0 227 421 | 12/1986 |
| EP | 0229413 A1 | 7/1987 |
| EP | 0236099 B2 | 9/1987 |
| EP | 0170385 | 2/1988 |
| EP | 0350170 B2 | 1/1990 |
| EP | 0360491 A2 | 3/1990 |
| EP | 0 397 517 | 11/1990 |
| EP | 0 416 815 | 3/1991 |
| EP | 0416848 A1 | 3/1991 |
| EP | 0447035 A2 | 9/1991 |
| EP | 0 452 920 | 10/1991 |
| EP | 0451977 A1 | 10/1991 |
| EP | 0451997 A2 | 10/1991 |
| EP | 0461848 | 12/1991 |
| EP | 0 42 656 | 1/1992 |
| EP | 0217596 B1 | 1/1992 |
| EP | 0516019 A2 | 2/1992 |
| EP | 0 485 099 | 5/1992 |
| EP | 0 495 099 | 7/1992 |
| EP | 0492656 B1 | 7/1992 |
| EP | 0 562 493 | 3/1993 |
| EP | 0552911 B1 | 7/1993 |
| EP | 0 562 496 | 9/1993 |
| EP | 0562496 A1 | 9/1993 |
| EP | 0 597 502 | 5/1994 |
| EP | 0597502 B1 | 5/1994 |
| EP | 0 600 425 | 6/1994 |
| EP | 0 662 988 | 7/1995 |
| EP | 0 662 989 | 7/1995 |
| EP | 0662989 B1 | 7/1995 |
| EP | 0414202 B1 | 11/1995 |
| EP | 0706455 B1 | 4/1996 |
| EP | 0938521 B1 | 9/1999 |
| FR | 2516017 | 10/1982 |
| GB | 1 209 825 | 10/1970 |
| GB | 1209825 | 10/1970 |
| GB | 2 063 278 | 6/1981 |
| GB | 2 097 324 | 11/1982 |
| GB | 2124240 A | 2/1984 |
| GB | 2 206 890 | 1/1989 |
| JP | 58-37907 | 3/1983 |
| JP | 58-102762 | 6/1983 |
| JP | 102763/83 | 6/1983 |
| JP | 63-175004 | 7/1988 |
| JP | 1-101315 | 4/1989 |
| JP | 3-26541 | 2/1991 |
| JP | 10-276383 | 10/1998 |
| WO | 87/03887 | 7/1987 |
| WO | 1987/07880 | 12/1987 |
| WO | 90/03414 | 4/1990 |
| WO | 1990/03414 | 4/1990 |
| WO | 92/14784 | 9/1992 |
| WO | 1992/14784 | 9/1992 |
| WO | 93/09173 | 1/1993 |
| WO | 93/03093 | 2/1993 |
| WO | 93/08221 | 4/1993 |
| WO | 1993/08221 | 4/1993 |
| WO | 93/11940 | 6/1993 |
| WO | 93/12151 | 6/1993 |
| WO | 94/06857 | 3/1994 |
| WO | 1994/06857 | 3/1994 |
| WO | 94/07954 | 4/1994 |
| WO | 94/09060 | 4/1994 |
| WO | 1994/07954 | 4/1994 |

| WO | 1994/09060 | 4/1994 |
| WO | 1994/18263 | 8/1994 |
| WO | 1994/25523 | 11/1994 |
| WO | 95/00333 | 1/1995 |
| WO | 1995/04761 | 2/1995 |
| WO | 1993/09173 | 7/1995 |

OTHER PUBLICATIONS

Sherman, "Impact: Which Test to Use? Which Instrument to Buy?" Plastics Technology "PTonline.com", 2001.*
"Exact Linear Ethylene Polymers for Enhanced Sealing Performance", D. Van Der Sanden and R. W. Halle, Antec '92, pp. 154-158.
"A New Family of Liner Ethylene Polymers Provides Enhanced Sealing Performance", R.W. Halle and D. Van Der Sanden, Feb. 1992, Tappi Journal, pp. 99-103.
"PW Technology Watch", B. Miller, Plastics World, Nov. 1991, p. 29.
"Polyolefins Gain Higher Performance from New Catalyst Technologies", R. Leaversch, Modern Plastics, Oct. 1991, pp. 46-49.
"Exxon Cites Breakthrough in Olefins Polymerization", Modern Plastics, Jul. 1991, pp. 61-62.
"New Polyolefin Resins Emerge; Branched Linear Copolymers", Modern Plastics International, Nov. 1992, pp. 16-18.
"Enter a New Generation of Polyolefins", Plastics Technology, Nov. 1991, pp. 15-17.
"Novel Rheological Behavior Claimed for New-Tech Polyolefins", Plastics Technology, Nov. 1992, pp. 23-25.
"Dow's Patent on Elastic Substantially Linear Olefin Polymers", The Metallocene Monitor, 1993, pp. 2-6.
"Determination of Branching Distributions in Polyethyene and Ethylene Copolymrs", Wild et al, Journal of Polymer Science, vol. 0, 1982, pp. 441-455.
Homogeneous Catalysis, Industrial Applications and Implications:, American Chemical Society, 1968, R. Gould, Editor.
"A New Family of Linear Ethylene Polymers with Enhanced Sealing Performance", D. Van Der Sanden and R. W. Halle, 1991 Polymers Laminations & Coatings Conference, pp. 289-291.
"Single Site Metallocene Catalysts Yield Tailor Made Polyolefin Resins", Don Schwank, Modern Plastics International, Aug. 1993, pp. 40-41.
Film Containing Exact 4011 Sold Jun. 25, 1993.
"Sequence and Branching Distribution . . . ", 1993, vol. 25, pp. 2820-2827, Macromolecules.
U.S. Appl. No. 07/961,269, filed Oct. 14, 1992, Walton et al.
U.S. Appl. No. 07/955,614, filed Oct. 2, 1992, Garza et al.
Office Action in U.S. Appl. No. 07/976,122, dated Apr. 23, 1993, 2 pages.
Amendment in U.S. Appl. No. 07/976,122, dated Sep. 23, 1993, 2 pages.
Office Action in U.S. Appl. No. 07/976,122, dated Dec. 10, 1993, 3 pages.
Amendment under 37 CFR 1.111 in U.S. Appl. No. 07/976,122, dated Mar. 10, 1994, 9 pages.
Office Action in U.S. Appl. No. 07/976,122, dated May 31, 1994, 3 pages.
Notice of Appeal in U.S. Appl. No. 07/976,122, dated Nov. 30, 1994, 1 page.
Amendment under 37 CFR 1.116 in U.S. Appl. No. 07/976,122, dated Nov. 30, 1994, 7 pages.
Notice of Allowability in U.S. Appl. No. 07/976,122, dated Jan. 9, 1995, 1 page.
Notice of Allowance and Statement of Reasons for Allowance in U.S. Appl. No. 07/976,122, dated Jan. 9, 1995, 4 pages.
Notice of Abandonment in U.S. Appl. No. 07/976,122, dated May 25, 1995, 1 page.
Office Action in U.S. Appl. No. 07/983,017, dated Apr. 23, 1993, 3 pages.
Express Abandonment in U.S. Appl. No. 07/983,017, dated Sep. 23, 1993, 1 page.
Notice of Abandonment in U.S. Appl. No. 07/983,017, dated Oct. 4, 1993, 1 page.
Notice under 37 CFR 1.251 - Abandoned Application in U.S. Appl. No. 07/983,017, dated Jul. 18, 2003, 2 pages.
Reply to Notice under 37 CFR 1.251 in U.S. Appl. No. 07/983,017, dated Jul. 21, 2003, 2 pages.
Office Action in U.S. Appl. No. 08/018,657, dated Apr. 23, 1993, 3 pages.
Amendment in U.S. Appl. No. 08/018,657, dated Sep. 23, 1993, 2 pages.
Office Action in U.S. Appl. No. 08/018,657, dated Nov. 30, 1993, 3 pages.
Amendment under 37 CFR 1.111 in U.S. Appl. No. 08/018,657, dated Feb. 28, 1994, 10 pages.
Office Action in U.S. Appl. No. 08/018,657, dated May 31, 1994, 3 pages.
Amendment under 37 CFR 1.111 in U.S. Appl. No. 08/018,657, dated Nov. 30, 1994, 7 pages.
Office Action in U.S. Appl. No. 08/018,657, dated Feb.17, 1993, 3 pages.
Response under 37 CFR 1.111 in U.S. Appl. No. 08/018,657, dated Jul. 14, 1995, 2 pages.
Office Action in U.S. Appl. No. 08/018,657, dated Nov. 2, 1995, 2 pages.
Amendment under 37 CFR 1.111 in U.S. Appl. No. 08/018,657, dated Apr. 2, 1996, 9 pages.
Office Action in U.S. Appl. No. 08/018,657, dated Aug. 15, 1996, 9 pages.
Amendment under 37 CFR 1.111 in U.S. Appl. No. 08/018,657, dated Dec. 16, 1996, 16 pages.
Office Action in U.S. Appl. No. 08/018,657, dated Jun. 3, 1997, 11 pages.
Notice of Abandonment in U.S. Appl. No. 08/018,657, dated Jan. 16, 1998, 1 page.
Office Action in U.S. Appl. No. 08/418,926, dated Feb. 21, 1996, 16 pages.
Amendment in U.S. Appl. No. 08/418,926, dated Mar. 12, 1996, 11 pages.
Office Action in U.S. Appl. No. 08/418,926, dated Jul. 11, 1996, 10 pages.
Office Action in U.S. Appl. No. 08/481,782, dated Sep. 16, 1996, 14 pages.
Amendment under 37 CFR 1.111 in U.S. Appl. No. 08/481,782, dated Mar. 17, 1997, 25 pages.
Notice of Allowance in U.S. Appl. No. 08/481,782, dated Jun. 17, 1997, 3 pages.
Notice of Abandonment in U.S. Appl. No. 08/481,782, dated Mar. 9, 1998, 1 page.
Office Action in U.S. Appl. No. 08/747,241, dated Jun. 25, 1997, 16 pages.
Notice of Abandonment in U.S. Appl. No. 08/747,241, dated Mar. 9, 1998, 1 page.
Office Action in U.S. Appl. No. 08/932,946, dated Feb. 22, 1999, 6 pages.
Amendment under 37 CFR 1.111 in U.S. Appl. No. 08/932,946, dated Aug. 18, 1999, 5 pages.
Terminal Disclaimer over U.S. Pat. No. 5,604,043 in U.S. Appl. No. 08/932,946, dated Aug. 18, 1999, 1 page.
Supplemental Amendment under 37 CFR 1.111 in U.S. Appl. No. 08/932,946, dated Nov. 1, 1999, 2 pages.
Notice of Allowance, Notice of Allowability, Interview Summary, in U.S. Appl. No. 08/932,946, dated Nov. 9, 1999, 5 pages.
Notice of Abandonment in U.S. Appl. No. 08/932,946, dated Mar. 17, 2000, 1 page.
Notice of Recinded Abandonment in U.S. Appl. No. 08/932,946, dated May 31, 2000, 1 page.
Office Action in U.S. Appl. No. 08/932,946, dated Aug. 11, 2000, 11 pages.
Amendment under 37 CFR 1.111 in U.S. Appl. No. 08/932,946, dated Jan. 11, 2001, 13 pages.
Interview Summary in U.S. Appl. No. 08/932,946, dated Oct. 10, 2000, 1 page.
Office Action in U.S. Appl. No. 08/932,946 in U.S. Appl. No. 08/932,946, dated Apr. 10, 2001, 6 pages.
Preliminary Amendment in U.S. Appl. No. 08/932,946, dated Jun. 13, 2001, 6 pages.

Notice of Non-Compliant Amendment in U.S. Appl. No. 08/932,946, dated Jul. 6, 2001, 1 page.
Corrected Preliminary Amendment in U.S. Appl. No. 08/932,946, dated Jul. 13, 2001, 6 pages.
Office Action and Interview Summary in U.S. Appl. No. 08/932,946, dated Sep. 27, 2001, 7 pages.
Amendment under 37 CFR 1.111 in U.S. Appl. No. 08/932,946, dated Nov. 2, 2001, 10 pages.
Notice of Allowance, Notice of Allowability, Reasons for Allowance in U.S. Appl. No. 08/932,946, dated Apr. 4, 2002, 5 pages.
Request for Continued Examination in U.S. Appl. No. 08/932,946, dated Sep. 9, 2002, 1 page.
Petition under 37 CFR 1.313 in U.S. Appl. No. 08/932,946, dated Sep. 9, 2002, 2 pages.
Notice of Allowance, Notice of Allowability in U.S. Appl. No. 08/932,946, dated Sep. 25, 2002, 8 pages.
Office Action in U.S. Appl. No. 08/962,825, dated May 12, 1999, 5 pages.
Amendment under 37 CFR 1.111 in U.S. Appl. No. 08/962,825, dated Nov. 11, 1999, 19 pages.
Terminal Disclaimer over U.S. Appl. No. 08/996,367 in U.S. Appl. No. 08/962,825, dated Nov. 11, 1999, 1 page.
Interview Summary in U.S. Appl. No. 08/962,825, dated Jan. 19, 2000, 1 page.
Supplemental Amendment under 37 CFR 1.111 in U.S. Appl. No. 08/962,825, dated Feb. 10, 2000, 10 pages.
Interview Summary in U.S. Appl. No. 08/962,825, dated Feb. 9 & 24, 2000, 2 pages.
Notice of Allowance, Notice of Allowability in U.S. Appl. No. 08/962,825, dated Feb. 29, 2000, 4 pages.
Notice of Abandonment in U.S. Appl. No. 08/962,825, dated Aug. 3, 2000, 1 page.
Office Action in U.S. Appl. No. 08/996,367, dated May 13, 1999, 12 pages.
Amendment in U.S. Appl. No. 08/996,367, dated Nov. 15, 1999, 32 pages.
Interview Summary in U.S. Appl. No. 08/996,367, dated Jan. 19, 2000, 1 page.
Supplemental Amendment under 37 CFR 1.111 in U.S. Appl. No. 08/996,367, dated Feb. 4, 2000, 12 pages.
Office Action in U.S. Appl. No. 08/996,367, dated Apr. 21, 2000, 15 pages.
Interview Summary in U.S. Appl. No. 08/996,367, dated Oct. 10, 2000, 1 page.
Amendment under 37 CFR 1.111 in U.S. Appl. No. 08/996,367, dated Oct. 10, 2000, 23 pages.
Office Action in U.S. Appl. No. 08/996,367, dated Jan. 17, 2001, 18 pages.
Amendment under 37 CFR 1.111 in U.S. Appl. No. 08/996,367, dated Jun. 18, 2001.
Office Action in U.S. Appl. No. 08/996,367, dated Sep. 7, 2001, 21 pages.
Amendment under 37 CFR 1.116 in U.S. Appl. No. 08/996,367, dated Feb. 6, 2002, 13 pages.
Notice of Appeal in U.S. Appl. No. 08/996,367, dated Feb. 6, 2002, 1 page.
Advisory Action in U.S. Appl. No. 08/996,367, dated Mar. 27, 2002, 3 pages.
Appeal Brief under 37 CFR 1.192 in U.S. Appl. No. 08/996,367, dated Aug. 2, 2002, 49 pages.
Supplemental Amendment under 37 CFR 1.116 in U.S. Appl. No. 08/996,367, dated Aug. 2, 2002, 4 pages.
Advisory Action in U.S. Appl. No. 08/996,367, dated Sep. 02, 2002, 3 pages.
Office Communication and Interference Initial Memorandum in U.S. Appl. No. 08/996,367, dated Nov. 5, 2002, 6 pages.
Office Action in U.S. Appl. No. 09/583,654, dated Oct. 3, 2000, 9 pages.
Amendment under 37 CFR 1.111 in U.S. Appl. No. 09/583,654, dated Mar. 2, 2001, 22 pages.
Terminal Disclaimer over USPN 5,604,043 in U.S. Appl. No. 09/583,654, dated Mar. 2, 2001, 1 page.
Notice of Non-Compliant Amendment in U.S. Appl. No. 09/583,654, dated Mar. 19, 2001, 2 pages.
Notice of Abandonment in U.S. Appl. No. 09/583,654 in U.S. Appl. No. 09/583,654, dated May 8, 2001, 1 page.
Petition for Revival of an application for patent unintentionally abandoned under 37 CFR 1.137(b) in U.S. Appl. No. 09/583,654, dated May 25, 2001, 2 pages.
Amendment under 37 CFR 1.111 in U.S. Appl. No. 09/583,654, dated May 25, 2001, pages 24.
Terminal Disclaimer over USPN 5,604,043 in U.S. Appl. No. 09/583,654, dated May 25, 2001, 1 page.
Decision on Petition in U.S. Appl. No. 09/583,654, dated Jul. 23, 2001, 2 pages.
Office Action in U.S. Appl. No. 09/583,654, dated Oct. 24, 2001, 8 pages.
Notice of Appeal in U.S. Appl. No. 09/583,654, dated Feb. 21, 2002, 1 page.
Appeal Brief under 37 CFR 1.192 in U.S. Appl. No. 09/583,654, dated Jul. 3, 2002, 30 pages.
Office Communication in U.S. Appl. No. 09/583,654, dated Dec. 10, 2002, 2 pages.
Amendment under 37 CFR 1.111 in U.S. Appl. No. 09/583,654, dated Mar. 26, 2003, 4 pages.
Interview Summary in U.S. Appl. No. 09/583,654, dated Mar. 26, 2003, 1 page.
Office Communication in U.S. Appl. No. 09/583,654, dated Feb. 23, 2006, 2 pages.
Amendment in U.S. Appl. No. 09/006,700, dated Jun. 3, 1999, 5 pages.
Office Action in U.S. Appl. No. 09/006,700, dated Jun. 10, 1999, 11 pages.
Office Action in U.S. Appl. No. 09/006,700, dated Mar. 24, 2000, 10 pages.
Preliminary Amendment in U.S. Appl. No. 09/006,700, dated Dec. 18, 2000, 4 pages.
Rule 131(b) Declaration of Mary E. Shepard, dated Oct. 6, 2000, 15 pages.
Information Disclosure Statement, dated Dec. 18, 2000, 7 pages.
Office Action in U.S. Appl. No. 09/006,700, dated Jan. 17, 2001, 8 pages.
Supplemental information Disclosure Statement filed in U.S. Appl. No. 09/006,700, with attachments, dated Jan. 24, 2001, 12 pages.
Amendment, dated Jun. 18, 2001, 8 pages.
Office Action in U.S. Appl. No. 09/006,700, dated Sep. 13, 2001, 5 pages.
Amendment after Final in U.S. Appl. No. 09/006,700, dated Mar. 7, 2002, 4 pages.
Notice of Allowability in U.S. Appl. No. 09/006,700, dated Mar. 29, 2002, 3 pages.
Memorandum - Jul 2003 (identifying Cryovac and Pechiney patent docs in interference) dated Jul. 2003, 1 page.
Notice Declaring Interference in Interference No. 105,092, dated May 30, 2003, 11 pages.
Amendment under 37 CFR 1.111, dated Mar. 26, 2003, 3 pages.
Amendment under 37 CFR 1.111, dated May 25, 2001, 8 pages.
Supplemental Amendment under 37 CFR 1.116 in U.S. Appl. No. 08/996,367, dated Aug. 2, 2002, 2 pages.
Amendment under 37 CFR 1.116 in U.S. Appl. No. 08/996,367, dated Feb. 6, 2002, 6 pages.
Cryovac Clean Copy of Claims, dated Jun. 12, 2003, 16 pages.
Pechiney Clean Copy of Claims, dated Jun. 13, 2003, 9 pages.
Amendment under 37 CFR 1.111 in U.S. Appl. No. 08/996,367, dated Jun. 18, 2001, 3 pages.
Notice Redeclaring Interference in Interference No. 105,092, dated Jul. 30, 2003, 4 pages.
Cryovac Family of Applications claiming 35 USC 120 Benefit of U.S. Appl. No. 07/976,122, with attachments, dated Aug. 13, 2003, 13 pages.
Cryovac List of References Intended to be Relied Upon in its Preliminary Motions Filed under 37 CFR §1.633(a): Refers to various US patents plus following Docs from attached 1449: #140, #211, #298, and #299, dated Sep. 17, 2003, 5 pages.

Order Setting Times in Interference No. 105,092 (first 3 pages only), dated Sep. 12, 2003, 3 pages.

Corrected Pechiney Miscellaneous Motion 2 (with exhibits) in Interference No. 105,092, dated Oct. 27, 2003, 44 pages.

Order (authorizing opposition and reply) in Interference No. 105,092, dated Oct. 29, 2003, 5 pages.

Cryovac Opposition 2, dated Nov. 3, 2003, 18 pages.

Cryovac Exhibit List: Refers to Translation of JP58-102762, Plus the following doc #s in the 1449 filed herewith: #300, #301, #302, #303, #304, dated Nov. 3, 2003, 4 pages.

Final Office Action in U.S. Appl. No. 08/082,226, dated Jul. 29, 1994, 8 pages.

Preliminary Amendment filed Jan. 10, 1993, dated Jan 10, 1993, 3 pages.

Amendment filed Jan 30, 1995 in U.S. Appl. No. 08/082,226, dated Jan. 30, 1995, 6 pages.

Affidavit under 37 CFR 1.132 of Johnny Q. Zheng, filed Jan. 30, 1995, dated Jan. 30, 1995, 21 pages.

Order - - Priority Times in Interference No. 105,092, dated Jun. 16, 2004, 5 pages.

Decision on Joint Motion for No. Interference-in-Fact In Interference No. 105,092, dated Jun. 30, 2004, 20 pages.

Pechiney Preliminary Statement in Interference No. 105,092, dated Jun. 23, 2004, 33 pages.

Order - - Rule 610 in Interference No. 105,092, dated Aug. 6, 2004, 6 pages.

L. Woo, et al., Thermoplastic elastomer behavior of Ultra-Low Density Polytheylene and a Comparison with Flexible PVC, *Antec '93*, pp. 358-361, May 9-13, 1993, 5 pages.

Jeffries, M., The Marketing Challenge Created by Single Site Catalysts in Polyolefins, *SPO '91*, pp. 41-55.

"Dow's Patent on Elastic Substantially Linear Olefin Polymers", *The Metallocene Monitor*, pp. 2-6, dated Jan. 1994, 5 pages.

Schwank, G., "Selected Applications for Constrained Geometry Catalyst Technology (CGCT) Polymers", *SPO '92*, Sep. 23, 1992, 21 pages.

"Dow enters the race toward specialty PE", *Techpak*, pp. 24-25, dated Jan. 13, 1994, 2 pages.

"Exact™ Facts" Exxon brochure, plus accompanying letter from Saul Pearlman, dated Jun. 15, 1994, 7 pages.

Declaration of Blaine C. Childress in Interference No. 105,092, dated May 3, 1994, 16 pages.

Cryovac List of References Intended to be Relied Upon in its Preliminary Motions Filed under 37 CFR §1.633(a), dated Sep. 17, 1993, 5 pages.

Order - Rule 121(f), dated Sep. 27, 2004, 54 pages.

Standing Order, dated Sep. 13, 2004, 31 pages.

Cryovac Reply to Sep. 27, 2004 Order under Rule 121(f), dated Dec. 17, 2004, 35 pages.

Cryovac Exhibit List 3 Refers to various patent-related documents Plus the following doc #s in the 1449 filed herewith: #305, #149, #150, #151, #152, #153, #154, #155, #156, #157, #158, #159, dated Dec. 17, 2004, 3 pages.

Encyclopedia of Polymer Science and Engineering, Second Edition, vol. 6, pp. 386,387, 416-418, and 429-434 (1986), dated 1986, 11 pages.

E. Veazey, "Potential for Linear Low density Polyethylene in Coextrusion film application," COEX '81 - First Annual International Conference on Coextrusion Markets and Technology, pp. 3-18 (Oct. 21, 1981), dated Oct. 21, 1981, 17 pages.

D. Bugada, "Sizes of Long Branches in Low Density Polyethylene," Journal of Applied Polymer Science, vol. 33, pp. 87-93 (1987), dated 1987, 7 pages.

Whittington's Dictionary of Plastics, Third Edition, p. 285 (1993), dated 1993, 2 pages.

B. Bersted, "On the Effects of Very Low Levels of Long chain Branching on Rheological Behavior in Polyethylene," Journal of applied Polymer Science, vol. 30, pp. 3751-3765 (1985), dated 1985, 15 pages.

W. Graessley, "Effect of Long Branches on the Flow Properties of Polymers", Accounts of Chemical Research, vol. 10, pp. 332-339 (1977), dated 1977, 8 pages.

J. Hughes, "Analysis of Long chain Branching in High Density Polyethylene", ANTEC '83, pp. 306-309 (1983).

Minutes from Cryovac Single-Site Investigation Team meeting (dates redacted- Exhibit 1022), Date redacted, 3 pages.

Minutes from Cryovac Single-Site Investigation Team meeting (dates redacted- Exhibit 1023), Date redacted, 1 page.

M. Naitove', "Polypropylenes Will Be the Next Wave of Metallocene-Catalyzed Polyolefins," Plastics Technology, pp. 19-21 (Aug. 1994), dated Aug. 1994, 4 pages.

Polymer Handbook - Fourth Edition, pp. 164-165 (1999), dated 1999, 4 pages.

European Search Report for EP Pat. Appln. No. 93118403.0, lists various US and foreign patent documents included in the attached 1449 or an earlier 1449, dated Apr. 28, 1994, 3 pages.

Reply to Official Communication of Apr. 1, 1996, dated Sep. 10, 1996, 3 pages.

Communication Pursuant to Article 96(2) and rule 51(2) EPC, dated May 29, 1997, 3 pages.

Reply to Official Communication, dated May 29, 1997, dated May, 12, 1997, 6 pages.

Summons to Attend Oral Hearing, dated May 12, 1997, 4 pages.

Summons to Attend Oral Hearing, dated Oct. 2, 1998, 2 pages.

Invitation Pursuant to Article 96(2) and Rule 51(2) EPC, dated Jan. 12, 1998, 2 pages.

Invitation Pursuant to Article 96(2) and Rule 51(2) EPC, dated Apr. 12, 1998, 2 pages.

Reply to Official Communication dated Dec. 4, 1998, dated Feb. 2, 1999, 11 pages.

Communication pursuant to Article 96(2) and Rule 51(2) EPC, dated Jun. 4, 1999, 4 pages.

Reply to Official Communication dated Apr. 20, 1999, dated Aug. 23, 1999, 2 pages.

Reply to Official Communication dated Apr. 6, 1999, dated Oct. 6, 1999, 5 pages.

Communication pursuant to Article 96(2) and Rule 51(2) EPC, dated Jun. 23, 2000, 2 pages.

Reply to Official Communication dated Jun. 20, 2000, dated Dec. 28, 2000, 3 pages.

Reply to Telephone Conversations with Examiner, Sep. 10, 2001, 7 pages.

Invitation Pursuant to Article 96(2) and Rule 51(2) EPC, dated Oct. 31, 2002, 2 pages.

Observations of Third Parties according to Article 115 EPC, dated May 21, 2002, 2 pages.

Communication under Rule 51(4) EPC, dated Jun. 21, 2002, 9 pages.

Communication pursuant to Article 96(2) EPC, dated Oct. 15, 2002, 4 pages.

Reply to Communication dated Oct. 15, 2002, dated Apr. 11, 2003, 6 pages.

Communication under Rule 51(4) EPC, dated Dec. 12, 2003, 10 pages.

Notice of Opposition of EP 0 597 502, Mar. 16, 2005, 4 pages.

Opposition of EP 0 597 502 by Gabriele Ludwig, lists various US and foreign patent documents included in the attached 1449 or an earlier 1449, plus the following doc #s in the 1449 filed herewith: #186, #306, #185, #187, #188, #307, #298, #308, #309, #189, #190, #183, #184, #191, dated Dec. 16, 2005, 16 pages.

U.S. Appl. No. 07/955,614, dated Oct. 2, 1992.

U.S. Appl. No. 07/961,269, dated Oct. 14, 1992.

B.C. Trudell, et al, "Single Site Catalyzed Ethylene Copolymers: Structure/Property Relationships", *ANTEC 1992*, pp. 613-617, dated 1992, 5 pages.

"First 'single-site-catalyst' PEs Are for medical and cable applications", *Modern Plastics International*, Aug. 1992, p. 48, Aug. 1992, 1 page.

"Biaxially Stretched in Comparison with Conventially Blown Coextruded Composite Plastic Films", *Polymer Engineering and Science*, Mid Feb. 1987, vol. 27, No. 3, pp. 225-231, Feb. 1987, 7 pages.

Exact Facts, Jun. 1994, dated Jun. 1994, 1 page.

Kuroda, N., et al, "Sequence and Branching Distribution of Ethylene/1-Butene Copolymers Prepared with a Soluble Vanadium-Based Ziegler-Natta Catalyst", *Macromolecules*, vol. 25, No. 11, 1992, dated 1992, 8 pages.

Tominari, K., "Special Applications and markets for Ethylene alpha Olefin Copolymers in Japan", *Specialty Plastics Conference '86*, pp. 301-335 (Nov. 13-15, 1986), Nov. 13-15, 1993, 33 pages.

U.S. Appl. No. 07/976,122, dated Nov. 13, 1992.

Communication of a Notice of Opposition, dated Jan. 19, 2006, 5 pages.

Response to Communication under Rule 57(1), dated Nov. 23, 2006, 4 pages.

Response to Opposition of EP 0 597 502 by Cryovac, Inc., dated Nov. 23, 2006, 11 pages.

Summons to Attend Oral Proceedings pursuant to Rule 71(1) EPC, dated Feb. 7, 2007, 7 pages.

Written Submissions filed on behalf of Dow, in preparation for Oral Proceedings, dated Aug. 2, 2007, 9 pages.

Written Submissions filed in Advance of Oral Proceedings for EP 0 597 502, dated Oct. 2, 2007, 15 pages.

Minutes of the Oral Proceedings before the Opposition Division for EP 0 597 502, May 11, 2007, 18 pages.

Decision Revoking the European Patent EP 0 597 502, dated May 11, 2007, 13 pages.

Letter from Michael Levinson to Johnnie Walters, dated Apr. 15, 1992, 2 pages.

"Exact™ Polymer Grade Slate", dated Sep. 10, 1992, 1 page.

"First 'single-site-catalyst' PEs Are for medical and cable applications", *Modern Plastics International*, dated Aug. 1992, 1 page.

Exact™ Polymers for Film Packaging Applications, undated, 2 pages.

Exact™ 3027 Linear Ethylene Polymers for Cast Film Applications, Oct. 1992, 1 page.

Supplementary European Search Report for EP 0 706 455 Lists various US and foreign patents documents included in the attached 1449 or an earlier 1449, dated Dec. 13, 1996, 2 pages.

Opposition Against EP 0 706 455 B1 (Dow) Lists various foreign patent documents included in the attached 1449 or an earlier 1449, Plus the following doc #s in the 1449 filed herewith: #207, #208, #209, #210, #211, #212, #213, dated May 27, 2004, 11 pages.

Schwank, G., "Selected Applications for Constrained Geometry Catalyst Technology (CGCT) Polymers", *SPO '92*, Sep. 23, 1992, 21 pages.

Program Update on SPO 92, dated Sep. 22-24, 1992, 6 pages.

Swogger, K., "The Material properties of Polymers Made from Constrained Geometry Catalysts", SPO '92, dated Sep. 22-24, 1992, 18 pages.

Opposition Brief by Pechiney Plastic Packaging dated Dec. 8, 2000 against patent EP 600425, pp. 31-37, dated Dec. 8, 2000, 9 pages.

Exact Polymers for Targeted Performance in Film Polymers for Targeted Performance in Film Packaging, Exxon Chemical brochure, Sep. 1992, dated Sept. 1992, 7 pages.

Exact™ Polymers for Film Packaging Applications, Laminations: Exact polymers bridge the gap between VLDPEs and Ionomers (Oct. 1992), dated Oct. 1992, 4 pages.

Wiley Encyclopedia of Packaging Technology, 1986, pp. 367-368, vertical form fill and seal, dated 1986.

Notice of Opposition of EP 0 706 455 by Sealed Air Corporation, List various US and foreign patent documents included in the attached 1449 or an earlier 1449, Plus the following doc #s in the 1449 filed herewith: #219, #220, #221, #190, dated May 26, 2004, 41 pages.

Further submissions in Opposition by opponent Sealed Air Corporation Lists the following doc #s in the 1449 filed herewith: #224, #225, #226, dated May 27, 2004, 2 pages.

H. Shigemoto and M. Sugi (Mitsui Petrochemical) Presentation at FUTURE-PAK '91, Ninth International Conference on Food Packaging Innovations, pp. 293-316 (Oct. 2-4, 1991), dated Oct. 2-4, 1991.

Webster' Third New International Dictionary, 1986, p. 26, entry for "adjacent", dated 1986, 3 pages.

"Competition for metallocenes could turn ugly", Plastics World, Jan. 1995, pp. 33-36, dated Jan. 1995, 4 pages.

H.H. Britzinger et al., "Stereospecific Olefin Polymerization with Chiral Metallocene Catalysts", Angew. Chem. Int. Ed. Engl, 1995, 34, 1143 and 1149, dated 1995, 2 pages.

Letter to EPO from Sealed Air Corporation providing additional arguments, dated May 27, 2004, 3 pages.

Proprietor's observations on Notices of Opposition filed by Opponents Sealed Air and Dow, dated May 5, 2005, 19 pages.

Office Action in EP Application No. 93 922 755.9 (=EP 0 662 989), dated Apr. 29, 1999, 5 pages.

Proprietor Request for Revocation of EP 0 662 989, dated Aug. 13, 1999, 1 page.

Decision Revoking EP 0 662 989, dated Aug. 30, 1999, 1 page.

Summons to Attend Oral Hearing, dated Jul. 28, 2005, 7 pages.

Brief Communication from EPO re EP 0 706 455 and letter from proprietor of patent, dated Dec. 5, 2005, 22 pages.

Summons to Attend Oral Proceedings, Sep. 21, 2005, 1 page.

Brief Communication and letter from proprietor of patent in EP 0 706 455, dated Jun. 4, 2006, 2 pages.

Brief Communication and letter from opponent II (Dow) of EP 0 706 455, dated Mar. 3, 2006, 32 pages.

Provision of a copy of the minutes in Accordance with Rule 76(4) EPC, dated May 18, 2006, 7 pages.

Decision Revoking EP 0 706 455, dated Sep. 27, 2006, 15 pages.

American National Can (now Pechiney): Statement of Grounds of Opposition of AU Patent Application No. 681116 (60545/94) by W.R. Grace & Co. - CONN. (owner of Cryovac, Inc.); opposition papers list various US and foreign patent documents included in the attached 1449 or an earlier 1449, plus Doc #310 in the 1449 filed herewith, dated Feb. 23, 1998, 8 pages.

Declaration of David John Tadgell Listing DJT-2=U.S. Appl. No. 08/082,226 =doc #238, dated Nov. 23, 1998, 2 pages.

Declaration of David Henry Solomon, citing WO 95/00333, Doc #237 and Doc. #238, dated Dec. 29, 1998, 29 pages.

Exhibit DHS-2: AU-B-60545/94, dated Dec. 10, 1998, 44 pages.

Exhibit DHS-4: U.S. Appl. No. 08/082,226, dated Dec. 10, 1998, 41 pages.

Amendments - Amending a specification, dated Jun. 26, 2008, 2 pages.

Third Statement of Proposed Amendments in Australian Patent Application No. 60545/94, dated Jun. 26, 2008, 41 pages.

International Search Report for PCT/US94/07059, citing one US patent and Doc. #310 in the 1449 filed herewith, dated Jun. 3, 1999, 5 pages.

International Preliminary Examination Report for PCT/US94/07059, dated Sep. 13, 1995, 4 pages.

Request to Amend and Proposed Amendment for PCT/US94/07059, dated Nov. 23, 1998, 7 pages.

Patent Examination Report, dated Feb. 18, 1997, 4 pages.

Australian Examiner's First Report on Patent Application No. 72118/94, dated Feb. 26, 1997, 2 pages.

Letter setting forth statement of proposed amendments filed in AU Patent Application No. 72118/94, dated Nov. 23, 1998, 1 page.

Letter setting forth statement of proposed amendments filed in AU Patent Application No. 72118/94, dated Nov. 25, 1998, 1 page.

Standard Search Report for EP file No. RS 91761DE; cites various US and foreign patent documents included in the 1449 filed herewith or an earlier 1449, dated Jul. 23, 1993, 2 pages.

European Search Report for EP 93 11 9235; cites various US and foreign patent documents in the 1449 filed herewith or an earlier 1449, plus Doc. #197 in 1449 filed herewith, dated Feb. 17, 1994, 2 pages.

Communication Pursuant to Article 96(2) and Rule 51(2) EPC in EP 93 11 9235, dated Dec. 13, 1996, 4 pages.

Response to Official Communication dated Dec. 13, 1994 in EP 93 11 9235, dated Jun. 23, 1997, 13 pages.

Summons to Attend Oral Hearing in EP 93 11 9235, dated Dec. 5, 1997, 4 pages.

Preparation of Oral Proceedings, dated Jan. 20, 1998, 2 pages.

Summons to Attend Oral Proceedings, dated Feb. 10, 1998, 2 pages.

Response including New Claims (main request first auxiliary request, and second auxiliary request) (pages); lists D8-D29, i.e., Doc. #311, Doc. #329, Doc. #307, Doc. #220, and Doc. #312 through Doc. #328, dated Nov. 6, 1998, 49 pages.

Invitation Pursuant to Article 96(2) and Rule 51(2) EPC in EPC in EP 93 11 9235, dated Dec. 4, 1998, 2 pages.
Reply to Official Communication dated Dec. 4, 1998, dated Feb. 2, 1999, 11 pages.
Communication under Rule 51(4) EPC, dated Apr. 20, 1999, 2 pages.
Reply to Official Communication dated Apr. 20, 1999, Aug. 23, 1999, 2 pages.
Decision to Grant a European Patent Pursuant to Article 97(2) EPC, dated Jan. 27, 2000, 1 page.
Opposition of EP-B- 0 600 425 by Pechiney Plastic Packaging, Inc., Dec. 8, 2000, including Evidence and Arguement in Support of Grounds of Opposition, dated Dec. 8, 2000, 55 pages.
Communication of a Notice of Opposition of EP-B- 0 600 425 by The Dow Chemical Company, Dec. 8, 2000, 18 pages.
Notice of Opposition of EP-B- 0 600 425 by Dr. Werner Behnisch, Nov. 20, 2000, dated Nov. 20, 2000, 16 pages.
Letter from Dr. N. ter Meer regarding patentability of claims filed Dec. 28, 2000, dated Sep. 5, 2001, 2 pages.
Proprietor's letter of reply to EPO of Oct. 9, 2001, regarding telephone conversations with examiner, and new claims 1-27, dated Sep. 10, 2001, 6 pages.
Proprietor's observations on the notices of opposition of Dr. Behnisch, Dow, and Pechiney, including list of cited references and claims, dated Jun. 14, 2002, 27 pages.
SPO '92, Table of Contents, dated Sep. 22-24, 1992, 6 pages.
Letter from Robin Geary to Duncan Curley, dated Aug. 4, 2003, 1 page.
Pechiney response to Proprietor's comments filed Jun. 14, 2002, 5 pages.
Summons to Attend Oral Hearing in EP Application No. 93119235.5, dated Jun. 28, 2004, 10 pages.
Brief filed by Proprietor in preparation for oral proceedings, dated Nov. 8, 2004, 26 pages.
Brief filed by Dow in preparation for oral proceedings, dated Nov. 8, 2004, 14 pages.
Minutes of Oral Proceedings of Aug. 12, 2004 Plus claims annexes, dated Dec. 23, 2004, 14 pages.
Decision Revoking EP 0 600 425 B1, dated Jan. 3, 2005, 9 pages.
Annexes I-IV accompanying Decision Revoking patent: Annex I: EP 0 600 425; Annex II: Main Request (Set C), Annex III: Auxiliary Request (Set E), Annex IV: $2^{nd}$ Auxiliary Request (Set M), dated Jun. 8, 1994, 32 pages.
Proprietor's Statement of Grounds for Appeal, dated May 3, 2005, 20 pages.
Dow's statement of response in reaction to the motivated statement of appeal by Patentee, dated Nov. 25, 2005, 15 pages.
Pechiney's response to proprietor's statement of grounds for appeal, dated Sep. 20, 2005, 1 page.
Response by Dr. Behnisch to Proprietor's statement of grounds of appeal, dated Jan. 18, 2006, 6 pages.
Proprietor's Reply to Official Communication dated Mar. 27, 2008 and in preparation for oral proceedings, Apr. 18, 2008, 13 pages.
Minutes of Oral Proceedings of Appeal, and $2^{nd}$ Auxiliary Request (Set M), dated May 26, 2008, 9 pages.
C.J. Benning, Plastic Films for Packaging, Technology, Applications, and Economics, 1983, pp. 19-19, dated 1983, 11 pages.
Encyclopedia of Polymer Science and Engineering, vol. 10, Molecular Weight Determination to Pentadiene Polymers, John Wiley & sons, 1987, pp. 619-635 (1987), dated 1987, 17 pages.
Encyclopedia of Polymer Science and Engineering, vol. 7, Fibers, Optical to Hydrogenation, John Wiley & sons, 1987, pp. 88-105 (1987), dated 1987, 18 pages.
W. Graessley, "Effect of Long Branches on the Flow Properties of Polymers", Accounts of Chemical Research, vol. 10, pp. 332-339 (1977), dated 1977, 8 pages.
M.K. Reinking, Equistar Chemicals, LP, Presentation at SPE Polyolefins XII Conference, pp. 259-286, undated.
Decision of the Technical Board of Appeal, dated Jun. 17, 2008, 42 pages.
B.K. Hunter, "The Preparation and Characterization of Homogeneous Copolymers of Ethylene and 1-Alkenes", Journal of Polymer Science, Polymer Science Edition, vol. 22, 1383-1392 (1984), dated 1984, 10 pages.

Exact Facts, Vol. 1, No. 1, Feb. 1992, dated Feb. 1992, 3 pages.
ASTM D 3763-95a: Standard Test Method for High Speed Puncture Properties of Plastic Using Load and Displacement Sensors, dated Jan. 1996.
Dow Plastics unveils single-site catalyst resins for packaging, Oct. 1993, 1 page.
"Think of Affinity as a Pvc Replacement", Techpak, pp. 3-4, undated, 2 pages.
"CGC Polyolefins re for applications within many major packaging markets, says Dow", Techpak, Oct. 5, 1992, dated Oct. 5, 1992, 1 page.
"Dow throws its hat in the new-generation polyolefin packaging resins ring", Techpak, Aug. 10, 1992, page 6, dated Aug. 10, 1992, 1 page.
"It was a big week for polyolefin plastomers - both the Exxon and Dow kinds", Plastics Focus, vol. 25, No. 18, Monday, Sep. 13, 1993, pp. 1-2, dated Sep. 13, 1992, 2 pages.
"Dow's polyolefin plastomers have an affinity for packaging", Techpak, pp. 1&4, dated Sep. 20, 1993, 2 pages.
Affinity Polyolefin Plastomers, Dow Brochure, together with various resin sheets, dated Aug. 1993, 36 pages.
"Exxon Cites 'Breakthrough' in Olefin Polymerization", Modern Plastics, Jul. 1991, pp. 61-62, dated Jul. 1991.
A New Family of Linear Ethylene Polymers With Enhanced Sealing Performance, Van der Sanden and Halle, 1991 Polymers, Laminations and Coatings Conference. pp. 289-296.
(D24): Union Carbide Memo (Jun. 5, 1986), 1 page, dated Jun. 5, 1986.
Minutes of the Oral Proceedings Before the Opposition Division, 7PP, Jan. 3, 2005, dated Jan. 03, 2005.
Brief Filed by Dow in Preparation for Oral Proceedings, 14PP, Nov. 8, 2004, dated Nov. 8, 2004.
Brief Filed by Cryovac in EPO, 26PP, Nov. 8, 2004, dated Nov. 8, 2004.
Summons to Attend Oral proceedings Pursuant to Rule 71(1) EPC, 10PP, Aug. 28, 2004, dated Aug. 28, 2004.
"VLDPE: A Breakthrough in Flexible Linear Polyethylene", Kurtz, Union Carbide Corp., Polyolefins Specialties R&D, ANTEC '85, pp. 463-466, dated 1985.
Easy Peelable Lid Material, Shigemoto et al, FUTURE-PAK '91, Ninth International Ryder Conference on Food Packaging Innovations, Oct. 2-4, 1991, pp. 293-316, dated Oct. 2-4, 1991.
Schut, J.H., "Enter a New Generation of Polyolefins", Plastics Technology, Nov. 1991, pp. 15-19, dated Nov. 1991.
Leaversuch, R.D., "Polyolefins Gain Higher Performance from New Catalyst Technologies", Modern Plastics, pp. 46-49, Oct. 1991, dated Oct. 1991.
PW Technology Watch Plastics World, Nov. 1991, p. 29, dated Nov. 1991.
Encyclopedia of Polymer Science and Engineering, vol. 10, Molecular Weight Determination to Pentadiene Polymers, John Wiley & sons, 1987, pp. 88-89, dated 1987.
D8: Selman, Future Trends in Polyolefins Technology, 'SPO '92, pp. 11-16, dated 1992.
D12: "Properties of Homogeneous and Heterogeneous Polyolefins", B.C. Childress (Metcon 1994), 30 pages, dated 1994.
D13: "Structure Property Relationships for Ethylene/1-Octene and Ethylene/1-Butene Copolymers Made Using INSITE Technology," Journ. Plastic Film & Sheeting (1996), 7 pages, dated 1996.
D14: Insite Catalyst Structure/Activity Relationships for Olefin Polymerization (MetCon 93), pp. 157-170, dated 1993.
D15: Insite Catalysts redefine polyolefin performance, European Plastics News undated.
D16: "Process Technology for Unique Polymer Design Using Dow Constrained Geometry Catalysts,", Polyolefins VIII International Conference (Feb. 1993), dated Feb. 1993.
D17: "'Plastomer Resins in Blown Film,"Plastics Technology (Feb. 1995), 5 pages, dated Feb. 1995.
D18: Notebook page No. 245532 B (1 page), Date redacted.
D19: "Advance performance Terpolymers for Blown Film Applications", (MetCon/94), 19 pages, dated 1994.

D20: "The Influence of Polymer Structure on melt strength Behavior of PE Resins," *Plastics Engineering* (Feb. 95), 4 pages, dated Feb. 1995.

D21: Linear low density polyethylene (LLDPE) - properties, processing and application (translation of Kunstoffe 74 (1984) 9, pp. 474/485, dated 1984.

D22: Affidavit of Blaine Childress Nov. 6, 1998 (2 pages), dated Nov. 6, 1992.

D23: Structure/Property Relationships in EXXPOL™ Polymers (SPO '91), dated 1991.

(D24): Union Carbide Memo (Jun. 5, 1986), 1 page, dated Jun. 5, 1986.

Redacted (D25): Cryovac UCC Technical Meeting Update (Apr. 13, 1989), 2 pages, date Redacted.

(D26): Table 1: Characterization of PE Resins, 1 page, dated Redacted.

(D27): Resin Figure from DSM, 1 page, Undated.

(D28) Unexpected Advantage: Impact Strength of Films of Invention (34 and 35), 1 page, Undated.

M. Naitove', "Propylenes Will Be The Next Wave of Metallocene-Catalyzed Polyolefins," Plastics Technology, pp. 19-21 (Aug. 1994), dated Aug. 1994.

* cited by examiner

US 7,588,830 B2

HEAT SHRINKABLE FILMS CONTAINING SINGLE SITE CATALYZED COPOLYMERS

This is a continuation of application Ser. No. 08/996,367, filed on Dec. 22, 1997.

This application is a continuation of U.S. Ser. No. 08/962,825, filed Nov. 3, 1997, now abandoned, which is a continuation of U.S. Ser. No. 08/018,657, filed Feb. 17, 1993, now abandoned, which is a continuation-in-part of U.S. Ser. No. 07/983,017, filed Nov. 30, 1992, now abandoned, which is a continuation-in-part of U.S. Ser. No. 07/976,122, filed Nov. 13, 1992, now abandoned.

FIELD OF THE INVENTION

The present invention is generally directed to heat shrinkable films containing single site catalyzed copolymers. The present invention is more particularly directed to heat shrinkable films containing homogeneous ethylene/alpha-olefin copolymers catalyzed by single site catalysts having a density of at least about 0.90 g/cc.

BACKGROUND OF THE INVENTION

Shrinkable thermoplastic films have found many useful applications in packaging of meats, cheeses, poultry and numerous other food and non-food products. There is always the search for improvement in these films to make them have better impact resistance, improved optics and improved shrinkability. For example, in U.S. Pat. No. 4,640,856 to Ferguson et al., the multilayer thermoplastic heat shrinkable film was described having improved shrink, toughness and barrier properties. The film included at least one layer of a very low density polyethylene and a gas barrier layer of vinylidene chloride copolymer or ethylene vinyl alcohol. The film was found to be particularly useful for making bags for packaging large cuts of fresh red meat.

U.S. Pat. Nos. 5,059,481, 4,976,898 and 4,863,769, all to Lustig et al., disclose heat shrinkable film suitable for packaging food articles such as frozen poultry, primal meat cuts and processed meat products wherein the film may be a biaxially stretched monolayer film of a very low density polyethylene copolymer or a multilayer film containing very low density polyethylene.

U.S. Pat. No. 4,457,960 to Newsome discloses the use of linear low density polyethylene in multiple layer molecularly oriented films.

Each of the foregoing patents describe the incorporation into heat shrinkable films of conventional ethylene/alpha-olefins produced by Ziegler-Natta catalyst systems. Ziegler-Natta catalytic methods are commonly used throughout the polymer industry and have a long history tracing back to about 1957.

These systems are often referred to as heterogeneous since they are composed of many types of catalytic species each at different metal oxidation states and different coordination environments with ligands. Examples of Ziegler-Natta heterogeneous systems include metal halides activated by an organometallic co-catalyst, such as titanium or magnesium chlorides complexed to trialkyl aluminum and may be found in patents such as U.S. Pat. Nos. 4,302,565 and 4,302,566. Because these systems contain more than one catalytic species, they possess polymerization sites with different activities and varying abilities to incorporate comonomer into a polymer chain.

The result of such multi-site chemistry is a product with poor control of the polymer chain architecture both within the sequence of a single chain, as well as when compared to a neighboring chain. In addition, differences in catalyst efficiency produce high molecular weight polymer at some sites and low molecular weight at others. Therefore, copolymers produced using these systems lead to polymer products which are mixtures of chains some high in comonomer and others with almost none. For example, conventional Ziegler-Natta multi-site catalysts may yield a linear ethylene/alpha-olefin copolymer (HDPE, LLDPE, VLDPE, ULDPE) having a mean comonomer percentage of 10, but with a range of 0% to 40% comonomer in individual chains. This, together with the diversity of chain lengths results in a truly heterogeneous mixture also having a broad molecular weight distribution (MWD).

Linear low density polyethylene (LLDPE) has enjoyed great success as a raw material choice for packaging films. The term LLDPE is generally understood to describe copolymers of ethylene and one or more other alpha olefin monomers which are polymerized at low pressure using a Ziegler-Natta catalyst to achieve a density range of about 0.915 to about 0.940. Although no clear standard exists, LLDPE polymers are often marketed in subgroups of densities such as linear medium density (LMDPE), linear low density polyethylene, linear very low density (VLDPE), or linear ultra low density polyethylene (ULDPE). These classifications are for marketing use and will vary by supplier.

These materials are different from high pressure low density polyethylene (LDPE) which is generally understood in the trade as a highly branched homopolymer having a single low melting point. For example, a 0.92 density LDPE would typically have a melting point at about 112° C. while a corresponding density LLDPE would have melting points at 107°, 120°, and 125° C. The multiple melting points are commonly observed with LLDPE and are a consequence of the above mentioned heterogeneous incorporation of comonomer.

Recently a new type of ethylene copolymer has been introduced which is the result of a new catalyst technology. Examples of introductory journal articles include "Exxon Cites 'Breakthrough' in Olefins Polymerization," Modern Plastics, July 1991, p. 61; "Polyolefins Gain Higher Performance from New Catalyst Technologies," Modern Plastics, October 1991, p. 46; "PW Technology Watch," Plastics World, November 1991, p. 29; and "," Plastics Technology, November 1991, p. 15.

These new resins are produced using metallocene catalyst systems, the uniqueness of which resides in the steric and electronic equivalence of each catalyst position. Metallocene catalysts are characterized as having a single, stable chemical type rather than a volatile mixture of states as discussed for conventional Ziegler-Natta. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distributions from 1.5 to about 15. The choice of co-catalyst influences the efficiency and thus the production rate, yield, and cost.

Exxon Chemical, in U.S. Pat. No. 4,701,432 sets out examples of which olefin catalyst systems are of the metallocene class and which are non-metallocene. They cite bis(cyclopentadienyl) dichloro-transition metal, bis(cyclopentadienyl) methyl, chloro-transition metal, and bis(cyclopentadienyl) dimethyl-transition metal as examples of metallocene catalysts, where the metals include choices such as titanium, zirconium, hafnium, and vanadium. The patent further provides examples of non-metallocene catalysts as being $TiCl_4$, $TiBr_4$, $Ti(OC_4H_9)_2Cl_2$, $VCl_4$, and $VOCl_3$.

Similarly, C. P. Cheng, at SPO 91, the Specialty Polyolefins Conference sponsored by Schotland and held in Houston, Tex. in 1991, cited $TiCl_3/AlR_2Cl$ and $MgCl_2/TiCl_4/AlR_3$ as examples of non-metallocene Ziegler-Natta catalysts and transition metal cyclopentadienyl complexes as examples of metallocene homogeneous polyolefin catalysts.

As a consequence of the single site system afforded by metallocenes, ethylene/alpha-olefin copolymer resins can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to the above mentioned Ziegler-Natta polymers, these single site metallocene polymers are characterized as having a narrow MWD and narrow compositional distribution (CD). While conventional polymers have MWD's of about 3.5 to 8.0, metallocenes range in MWD from about 1.5 to about 2.5 and most typically about 2.0. MWD refers to the breadth of the distribution of molecular weights of the polymer chains, and is a value which is obtained by dividing the number-average molecular weight into the weight average molecular weight. The low CD, or regularity of side branches chains along a single chain and its parity in the distribution and length of all other chains, greatly reduces the low MW and high MW "tails". These features reduce the extractables which arise from poor LMW control as well as improve the optics by removing the linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning Calorimeter (DSC) peak melting point peak. Unlike conventional resins which retain a high melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butene copolymer which was made using a conventional Ziegler catalyst reflects its heterogeneous nature with a melting point at about 120° C. DSC shows that the Ziegler resin is associated with a much wider melting point range and actually melts higher despite its lower density.

In recent years several resin suppliers have been researching and developing metallocene catalyst technology. The following brief discussion should be viewed as representative rather than exhaustive of this active area of the patent literature.

Dow in EP 416,815 disclosed the preparation of ethylene/olefin copolymers using monocyclopentadienylsilane complexed to a transition metal. The homogeneous ethylene copolymers which may be prepared using this catalyst are said to have better optical properties than typical ethylene polymers and be well suited for film or injection molding.

Welborn in Exxon U.S. Pat. No. 4,306,041 discloses the use of metallocene catalysts to produce ethylene copolymers which have narrow molecular weight distributions.

Chang, in Exxon U.S. Pat. No. 5,088,228 discloses the production of ethylene copolymers of 1-propene, 1-butene, 1-hexene, and 1-octene using metallocene catalysts.

Exxon in U.S. Pat. No. 4,935,397 discloses the production of ethylene copolymers using metallocene catalysts to manufacture polymer suitable for injection molding or thermoforming.

Welborn, in Exxon U.S. Pat. No. 5,084,534 discloses the use of bis(n-butylcyclopentadienyl) zirconium dichloride to produce high molecular weight polyethylene having a polydispersity of 1.8 and a density of 0.955 g/cc.

In Exxon U.S. Pat. No. 3,161,629 a cyclopentadienyl complex is disclosed which may be used to produce polyolefins having controlled molecular weight and density suitable for use in extrusion or injection molding.

Canich in Exxon U.S. Pat. Nos. 5,055,438 and 5,057,475 discloses the use of mono-cyclopentadienyl catalysts having a unique silicon bridge which may be employed to select the stereochemical structure of the polymer. Catalysts such as methyl, phenyl, silyl, tetramethylcyclopentadienyl-tertbutylamido-zirconium dichloride may be used to produce polyethylene and ethylene copolymers suitable for films and fibers.

Mitsui Toatsu in JP 63/175004 employed bis(cyclopentadienyl)ethoxy-ZrCl to prepare homogeneous ethylene copolymers.

Mitsubishi in JP 1,101,315 discloses the use of bis(cyclopentadienyl)$ZrCl_2$ for the preparation of ethylene butene copolymers.

It should be noted that at least some previously available ethylene based linear polymers approximated the physical and compositional properties achieved by the present metallocene catalyzed polyolefins. For example, in "Sequence and Branching Distribution of Ethylene/1-Butene Copolymers Prepared *with a Soluble Vanadium Based Ziegler-Natta Catalyst,*" *Macromolecules,* 1992, 25, 2820-2827, it was confirmed that a soluble vanadium based Ziegler-Natta catalytic system $VOCl_3/Al_2(C_2H_5)_3Cl_3$, acts essentially as a single site catalyst although $VOCl_3$ is not a metallocene. Homogeneous copolymers produced by such a catalyst system have been commercially available for several years. An example of such are the resins sold under the tradename Tafmer™ by Mitsui.

U.S. Pat. No. 4,501,634 to Yoshimura et al is directed to an oriented, multilayered film which includes a Tafmer as a blend component in at least one layer.

Japanese Kokoku 37907/83 to Gunze Limited was directed to a heat-sealable biaxially oriented composite film wherein the heat seal layer contains Tafmer in a blend.

The foregoing patents disclose homogeneous ethylene alpha-olefins having densities below 0.90 g/cc. Heretofore, such resins have been generally unavailable in densities at and above 0.90 g/cc because of limitations in the $VOCl_3$ process. Yet, U.S. Pat. No. 1,209,825 to DuPont discloses homogeneous copolymers having densities up to about 0.920 made with single site Zigler catalysts. When extruded into a film the resins exhibit improved physical and optical properties as compared to films of heterogeneous copolymers. However, such homogeneous copolymers of densities above 0.90 g/cc have been commercially unavailable. It is believed that process limitations precluded the manufacture of such resins in any but bench-top quantities. Metallocene catalysts, however, can provide such homogeneous copolymers in a wide range of densities in commercial quantities. Thus, the processing benefits of homogeneity can now be incorporated into copolymers having densities analogous to those of conventional VLDPEs and LLDPEs. It has been found that in accordance with the present invention that such combination of properties are especially beneficial when these metallocene catalyzed resins are used in the production of heat shrinkable films and bags.

It is therefore an object of the present invention to provide heat-shrinkable, thermoplastic films and bags containing homogeneous copolymers which combine the benefits of homogeneity with the benefits of densities above 0.90 g/cc.

It is a further object of the present invention to provide such thermoplastic heat-shrinkable materials which may be multilayered with each layer serving a function or providing some characteristic to the overall film structure.

SUMMARY OF THE INVENTION

These as well as other objects are achieved by providing a heat-shrinkable film containing a homogeneous single cite catalyzed copolymer of ethylene and an alpha olefin having from 3 to 10 carbon atoms with a copolymer having at least about 0.90 g/cc.

Such objects are further achieved when the single cite catalyzed copolymer is blended with another thermoplastic homopolymer or copolymer.

Moreover, the objects of the present invention are achieved by providing a heat-shrinkable, multilayer film which includes at least a heat sealing layer, an inner layer containing a homogeneous single cite catalyzed copolymer of ethylene and an alpha-olefin having from 3 to 10 carbon atoms with the copolymer having at least about 0.90 g/cc, and a barrier layer.

DETAILED DESCRIPTION OF THE PREFERRED EMBODIMENTS

The present invention is directed to a heat-shrinkable, thermoplastic film or bag containing homogeneous copolymers of ethylene and at least one other alpha-olefin. The term "copolymer" as used herein is intended to denote polymers of two or more comonomers. Therefore, although the present specification generally discusses ethylene alpha-olefin copolymers such term is intended to encompass copolymers of ethylene with one or more alpha-olefins or ethylene with an alpha-olefin and another comonomer.

The term "oriented" is used herein interchangeably with the term "heat shrinkable," these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

The heat shrinkable film of the present invention is preferably oriented and is formed by extrusion processes especially art-known coextrusion methods. It is initially cooled to a solid state by, for example, cascading water or chilled air quenching, after which it is reheated to within its orientation temperature range and oriented by stretching. The stretching to orient may be accomplished in many ways such as, for example, by "blown bubble" techniques or "tenter framing." These processes are well known to those skilled in the art and refer to orientation procedures whereby the material is heated to its softening temperature and then stretched in the cross or transverse direction (TD) and/or in the longitudinal or machine direction (MD). After being heated and stretched, the film is quickly quenched while substantially retaining its stretched dimensions to cool the film rapidly and thus set or lock in the oriented molecular configuration.

The film layers may be formed by coextrusion, with additional layers thereafter being extrusion coated thereon to form multilayer films. Two multilayer tubes may also be formed with one of the tubes thereafter being extrusion coated or laminated onto the other. The extrusion coating method of film formation is preferable to coextruding the entire film when it is desired to subject one or more layers of the film to a treatment which may be harmful to one or more of the other layers. This may be done where it is desired to irradiate one or more layers of a film with high energy electrons where the film contains a barrier layer of one or more copolymers of vinylidene chloride (e.g., Saran™), such as vinylidene chloride and vinyl chloride or vinylidene chloride and methyl acrylate as well as vinylidene chloride with ethyl acrylate or acrylonitrile.

Films of this type would, for example, comprise those where the barrier layer is a Saran™ layer in addition to or instead of an EVOH layer. Those skilled in the art generally recognize that irradiation with high energy electrons is generally harmful to such Saran™ barrier layer compositions, as irradiation may degrade and discolor Saran™, making it turn brown. Thus, if full coextrusion followed by high energy electron irradiation of the multilayer structure is carried out on a film having a barrier layer containing a Saran™ layer, the irradiation should be conducted at low levels and with care. Alternatively, this may be avoided by extruding a first layer or layers, subjecting the layer or layers to high energy electron irradiation and thereafter applying the Saran™ barrier layer and, for that matter, other layers (which may or may not have been irradiated) sequentially onto the outer surface of the extruded, previously irradiated, tube. This sequence allows for high energy electron irradiation of the first layer or layers without subjecting the Saran™ barrier layer to harmful discoloration.

Thus, as used herein the term "extrusion" or the term "extruding" is intended to include coextrusion, extrusion coating, or combinations thereof.

As noted, the present heat shrinkable film may optionally be subjected to an energetic radiation treatment, including, but not limited to corona discharge, plasma, flame, ultraviolet, and high energy electron treatment. Irradiation is most preferably performed prior to orientation and, in the case of a Saran-containing barrier structure, prior to extrusion coating of the barrier component. Radiation dosages are referred to herein in terms of the radiation unit "RAD," with one million RADS or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

For those embodiments in which the present heat shrinkable film is a multilayer film, each layer will generally serve some function or provide some characteristic to the overall structure. Seal layer composition will be chosen for ease of heat sealing and, depending on the intended end use application, other factors such as grease resistance may be of importance. Outer layer composition may be chosen for abuse resistance or, where a given end use application requires a folded over "lap" seal, sealability to the seal layer. If a barrier layer is required it will be chosen for the degree of gas or moisture impermeability needed for the ultimate product to be packaged. Further internal layers may serve to add bulk to the film, promote shrinkability, promote interlayer adhesion or any combination of these properties.

The following examples are representative of the preferred embodiments of the present heat shrinkable films containing homogeneous linear ethylene alpha-olefin copolymers. In order to evaluate such films the following tests were employed:

Tensile Strength: A measure of the force required under constant elongation to break a specimen of the film; measured by ASTMD 882.

Elongation: A measure of the percent extension required to break a specimen of the film; measured by ASTMD 882.

Modulus: The ratio of the change in force to the change in elongation in the straight line portion of an Instron Tensile Testing curve; measured by ASTMD 882-Method A.

Tear Propagation: The force required to propagate a tear from a tiny slit made by a sharp blade in a specimen of the film; measured by ASTMD 1938.

Free Shrink: The percent dimensional change in a 10 cm.×10 cm. specimen of film when subjected to a selected heat; measured by ASTMD 2732.

Ball Burst: The energy necessary to burst and penetrate a restrained specimen of film; measured by ASTMD 3420.

Instrumented Impact: The energy necessary to puncture a restrained specimen of film, similar to ball burst, defined above. However, the Instrumented Impact Tester has the ability to measure the tensile/elongation curve to break. The "gradient" is the ratio of the change in force to change in elongation in the straight line portion of the curve. "Peak" is a measure of the maximum force exerted on the specimen to impart rupture. "Impact Energy" is a measure of the energy absorbed by the sample prior to rupture. Instrumented Impact is measured by ASTMD 3763.

Haze: The percentage of transmitted light which is scattered forward while passing through a specimen; measured by ASTMD 1003—Method A.

Clarity: A measure of the distortion of an image viewed through a specimen; measured by ASTMD 1746.

Gloss: The surface reflectance or shine of a specimen; measured by ASTMD 2457.

Parallel Plate: A bag is confined between two plates a specified distance apart and is inflated until its seal fails. The pressure level inside the bag at the point of failure is a measure of seal quality. Results are reported in inches of water pressure (IOWP).

LRHB (Linear Ramped Hot Burst): A clean sealed bag is inflated to a specified dwell pressure and the seal area is submerged in hot water at 182° F. After five seconds the pressure inside the bag is increased at the rate of 2 inches of water/second. The time to failure and burst pressure is a measure of seal quality. Test results are reported in seconds and inches of water pressure (IOWP).

LRHB-G (Linear Ramped Hot Burst-Grease): The procedure is the same as the LRHB test described above except peanut oil is first applied to the seal area.

VPHB (Variable Pressure Hot Burst): As with the LRHB test described above, a clean sealed bag is inflated to a specified dwell pressure and the seal area is submerged in hot water at 182 F. After five seconds the pressure inside the bag is increased at a specified rate ranging 1 to 7 inches of water/second. Here again, test results are reported as seconds and inches of water pressure (IOWP).

VPHB-G (Variable Pressure Hot Burst-Grease): The procedure is the same as the VPHB test described above except peanut oil is first applied to the seal area.

Gel: A measure of the relative amount of ultra high molecular weight polymer present in a sample. A gel measurement can provide an indication of the level of crosslinking which is present in a sample since the amount of polymer which is collected as gel increases with crosslinking. Gel is determined by solvent extraction with boiling toluene. In this method a specimen weighting 0.4 grams is extracted for 21 hours in a cellulose thimble, removed, dried and reweighed. The percentage of gel is calculated by ratioing the polymer remaining (toluene insoluble fraction) to the original weight. However, a gel value of 0% cannot reliably indicate that no crosslinking has occurred. Rather, the level of crosslinking may not be great enough to provide measurable gel.

DSC: The differential scanning calorimeter (DSC) is an instrument which measures the heat flow to a polymer sample during the programmed heating of it at 10° C. per minute. The trace obtained from the DSC can be used to characterize a sample's starting and ending melting point as well as its peak melting point(s).

Polydispersity (Mw/Mn): A measure of the uniformity of chain lengths within a polymer sample. It defines the breadth of molecular weight distribution. It is obtained by dividing the weight average molecular weight (Mw) by the number average molecular weight (Mn). The Mw and Mn are determined by Gel Permeation Liquid Chromatography.

Example 1

Approximately 30 ml of resin pellets of Exxon SLP 3010A, a 0.910 density homogeneous ethylene butene copolymer having a 1.0 melt index were placed in the center of the mylar sheets of a press assembly, as described above. The assembly was held at 320° F. for 1 minute without applied pressure. At 30 and 45 seconds the top press plate was lowered as close as possible without applying pressure. The pressure was then increased to 500 psi and was maintained for 1 minute. The mylar sheets with the platen sandwiched therebetween were removed from the hot steel plates to allow the plates to cool to ambient temperature. The thickness of the platen was measured at several sites and ranged from 15-18 mils.

The platen was then oriented on the T.M. Long Stretcher laboratory orientation unit at the University of Tennessee, Knoxville, Tenn. The orientation conditions were as follows: air temperature=95° C.; dwell time=10 sec.; stretch ratio=3.5×3.5; strain ratio=2000%; plate temperature=120° C. The final film thickness was approximately 1 mil.

Example 2

A sample of Exxon SLP 3011D, a 0.902 density homogeneous ethylene hexene copolymer having a 1.0 melt index was formed into a film and oriented in accordance with the procedures set forth in Example 1. The orientation conditions were as follows: air temperature=88° C.; dwell time=15 sec.;

stretch ratio=3.5×3.5; strain ratio=2000%; plate temperature=105° C. The final film thickness was approximately 1 mil.

Example 3

A second sample of Exxon SLP 3011D was formed into a film and oriented in accordance with the procedures set forth in Example 1. The orientation conditions were as follows: air temperature=78° C.; dwell time=20 sec.; stretch ratio=3.5× 3.5; strain ratio=2000%; plate temperature=95° C. The final film thickness was approximately 1 mil.

Example 4

A third sample of Exxon SLP 3011D was formed into a film and oriented in accordance with the procedures set forth in Example 1. The orientation conditions were as follows: air temperature=78° C.; dwell time=30 sec.; stretch ratio=3.5× 3.5; strain ratio=2000%; plate temperature=95° C. The final film thickness was approximately 1 mil.

Example 5

Prior Art

A sample of Dowlex 2045 from Dow, a heterogeneous ethylene octene copolymer having a density of 0.920, was made into a film and oriented in accordance with the procedures set forth in Example 1 for comparative purposes. The orientation conditions were as follows: air temperature=105° C.; dwell time=30 sec.; stretch ratio=3.5×3.5; strain ratio=4000%; plate temperature=105° C. The resultant oriented film had a thickness of approximately 1 mil.

Example 6

Two platens made from Fina 8473, an ethylene propylene copolymer (EPC) with 3.1% by weight ethylene were pressed in accordance with the film formation process set forth in Example 1. A third platen formed of Exxon SLP 3011A, a homogeneous ethylene hexene copolymer having a density of 0.910 g/cc and a 1.0 M.I. made by the process of Example 1 was placed between the two EPC platens. The three layers were then pressed under heat and pressure to weld the three into a single multilayer film.

The multilayer film was then oriented on the T.M. Long-stretcher laboratory orientation unit at the University of Tennessee, Knoxville, Tenn. The orientation conditions were as follows: air temperature=105° C.; dwell time=30 sec.; stretch ratio=4.0×4.0; strain ratio=3900%; plate temperature=105° C. The final film thickness was approximately 1 mil.

Example 7

As set forth in Example 6 above, a multilayer film was produced by pressing a platen of Exxon SLP 3011D (made by the process of Example 1) between two platens of ethylene propylene copolymer.

The film was oriented under the following conditions: air temperature=100° C.; dwell time=30 sec.; stretch ratio=4.0× 4.0; strain ratio=3900%; plate temperature=100° C. The final film thickness was approximately 1 mil.

Example 8

Prior Art

As set forth in Example 7 above, a multilayer film was produced by pressing a platen of Dowlex 2045 between two platens of ethylene propylene copolymer for comparative purposes.

The film was oriented under the following condition: air temperature=114.5° C.; dwell time=30 sec.; stretch ratio=4.0×4.0; strain ratio=3900%; plate temperature=115° C. The final film thickness was approximately 1 mil.

Example 9

Several physical properties of the oriented monolayer film samples of Example 1-5 were evaluated and are given below in Table 1. The film of Example 5 is representative of the prior art and is given for comparative purposes.

TABLE 1

| Property/ | Film of | | | | |
| --- | --- | --- | --- | --- | --- |
|  | Ex. 1 | Ex. 2 | Ex. 3 | Ex. 4 | Ex. 5 |
| Tensile, psi | 15,300 | 22,917 | 19,088 | 18,822 | 13,500 |
| Elongation, % | 142 | 160 | 201 | 175 | 181 |
| Modulus, psi | 27,000 | 16,504 | 13,502 | 14,912 | 46,000 |
| Tear Propogation grams | 88 | 10 | 87 | 54 | 110 |
| Free Shrink, % (at 200° F.) | 13/10 | 43/38 | 50/48 | 55/53 | 3/6 |
| Ball Burst cm - kg | 11.0 | 45 | 50+ | 50+ | 5.3 |
| Instrumented Impact | 15.0 | 31 | 65 | 60 | 5.0 |
| Haze, % | 5.9 | 0.5 | 1.0 | 1.4 | 2.7 |
| Clarity, % | 44 | 89 | 81 | 83 | 80 |
| Gloss, 45 deg. | 65 | 95 | 89 | 88 | 77 |

The numbers shown for tear propogation for each film are subject to a very high standard deviation.

Example 10

As in Example 9 above, several physical properties of the oriented multilayer film samples of Examples 6-8 were evaluated and are given in Table II below. The film of Example 8 is representative of the prior art and is given for comparative purposes.

TABLE II

| Property/ | Film of | | |
| --- | --- | --- | --- |
|  | Ex. 6 | Ex. 7 | Ex. 8 |
| Tensile, psi | 9100 | 7027 | 8000 |
| Elongation, % | 77 | 82 | 91 |
| Modulus, psi | 85,800 | 66,623 | 75,000 |
| Tear Propogation grams | 4.5 | 5 | 15.8 |
| Free Shrink, % | 7-6 | 11-13 | 3-2 |
| Ball Burst cm - kg | 5 | 6 | 4 |
| Instrumented Impact | 10 | 7 | 8 |

TABLE II-continued

| Property/ | Film of | | |
|---|---|---|---|
| | Ex. 6 | Ex. 7 | Ex. 8 |
| Haze, % | 1.1 | 1.5 | 2.2 |
| Clarity, % | 85 | 85 | 24 |
| Gloss, 45 deg. | 89 | 84 | 85 |

Example 11

A three layer coextruded precursor film having the structure inner layer/core layer/outermost adhesive layer was formed. The inner layer was Elvax 3128 from DuPont, an ethylene vinyl acetate with 8.9% vinyl acetate (EVA-1); the core layer was Exxon SLP 3011D; and the outermost layer was Escorene LD-720.92 from Exxon, an ethylene vinyl acetate having 19% vinyl acetate (EVA-2). The precursor film was irradiated to 2 MR and thereafter extrusion coated with a barrier layer of a vinylidene chloride methyl acrylate from Dow and an outer abuse layer of LD 318.92 from Exxon, an ethylene vinyl acetate with 9% VA (EVA-3) to yield a resultant five layer film having the basic structure:

EVA-1/core/EVA-2/barrier/EVA-3

The five layer film was then oriented by a trapped bubble method out of hot water with both the preheat and hot bath temperatures at 195° C.

Examples 12-22

The procedure set forth in Example 11 was repeated eleven times, each time resulting in the basic structure:

EVA-1/core/EVA-2/Saran MA/EVA-3

Table III, below, outlines the variations in irradiation dosage, orientation preheat and hot bath temperatures and core layer composition. Example 1922 are representative of the prior art and are shown for comparative purposes.

TABLE III

| Example | Dose | Preheat | Hotbath | Core |
|---|---|---|---|---|
| 11 | 2MR | 195 | 195 | SLP 3011D |
| 12 | 4MR | 195 | 195 | SLP 3011D |
| 13 | 2MR | 210 | 210 | SLP 3011D |
| 14 | 4MR | 210 | 210 | SLP 3011D |
| 15 | 2MR | 195 | 195 | SLP 3011B |
| 16 | 4MR | 195 | 195 | SLP 3011B |
| 17 | 2MR | 210 | 210 | SLP 3011B |
| 18 | 4MR | 210 | 210 | SLP 3011B |
| 19 | 2MR | 195 | 195 | Attane 4203 |
| 20 | 4MR | 195 | 195 | Attane 4203 |
| 21 | 2MR | 210 | 210 | Attane 4203 |
| 22 | 4MR | 210 | 210 | Attane 4203 |

Exxon SLP 3011B is a homogeneous ethylene hexene copolymer having a density of 0.905 g/cc and a 2.1 M.I. Attane 4203 is a heterogeneous ethylene octene copolymer having a density of 0.905 g/cc.

The oriented multilayer films of Examples 11-22 were tested for free shrink and instrumented impact with the results given below in Table IV. It may be seen that when comparing the metallocene resin films of Examples 11 and 15 or 12 and 16 with the comparative example counterparts of 19 and 20, a substantial improvement in impact resistance is seen. Similarly, a comparison of Examples 13 and 17 or 14 and 18 with their respective comparative heterogeneous Examples 21 and 22 show an improved impact for the metallocene resins.

TABLE IV

| | Free Shrink | | Instrumented Impact | | |
|---|---|---|---|---|---|
| | | | Peak | Grad | Energy |
| Ex. # | L | T | lbs. | lb/in. | ft.lb |
| 11 | 31 | 45 | 86.8 | 56.9 | 5.97 |
| 12 | 31 | 45 | 86.0 | 55.2 | 6.06 |
| 13 | 14 | 34 | 37.1 | 33.2 | 1.96 |
| 14 | 17 | 34 | 46.4 | 33.5 | 2.74 |
| 15 | 30 | 41 | 77.4 | 53.5 | 5.34 |
| 16 | 30 | 42 | 71.9 | 51.6 | 4.12 |
| 17 | 17 | 35 | 43.5 | 37.2 | 2.73 |
| 18 | 18 | 34 | 56.4 | 37.9 | 4.17 |
| 19 | 30 | 45 | 54.2 | 46.0 | 2.91 |
| 20 | 30 | 45 | 55.1 | 49.4 | 2.63 |
| 21 | 20 | 37 | 40.9 | 37.6 | 1.95 |
| 22 | 21 | 38 | 46.1 | 40.8 | 2.20 |

Example 23

A two layer coextruded precursor film was formed having an inner layer of Exxon SLP-1-277, as homogeneous ethylene butene copolymer having a density of 0.900 g/cc and a 2.0 M.I. and a second layer of Excorene LD-720.92 from Exxon, EVA-1.

Following irradiation the precursor film was extrusion coated with a barrier layer of a vinylidene chloride methyl acrylate supplied by Dow and an outer layer of LD 318-92 from Exxon, EVA-2. Thereafter the total structure was oriented out of hot water by a trapped bubble technique. The final film structure and target percent thickness per layer was:

| SLP-1-277 | EVA-1 | Saran | EVA-2 |
|---|---|---|---|
| 14.71% | 50.84% | 9.24% | 25.21% |

Example 24

The procedure set forth in Example 23 was repeated with the exception that the inner layer of the precursor film was Exxon SLP-1-291, a homogeneous ethylene butene copolymer having a density of 0.904 g/cc and a 2.5 M.I.

Example 25

The procedure set forth in Example 23 was repeated with the exception that the inner layer of the precursor film was Exxon SLP-1-342, a homogeneous ethylene hexene copolymer having a density of 0.905 g/cc and a 1.5 M.I.

Example 26

For comparative purposes the procedure set forth in Example 23 was repeated with the exception that the inner layer of the precursor film was a blend of 90% by weight of NA 295-000 an ethylene vinyl acetate copolymer having 6.7% vinyl acetate supplied by Quantum, and 10% by weight of Dowlex 2045, a heterogeneous ethylene octene copolymer having a density of 0.920 g/cc, supplied by Dow. Such blend in a heat sealing layer is representative of the prior art.

Examples 27-38

The film tubing produced in each of Examples 23-26 was converted to eight inch side seal bags with the side seal machine running at 100 bags/minute at 6.0, 7.5 and 9.0 amps, respectively. Only very weak seals could be formed for each structure below 6.0 amps and sealing above 9.0 amps was precluded by puckering.

The samples were subjected to parallel plate, VPHB and VPHB-G tests. The results are shown in Table V below.

TABLE V

| Ex. # | Film of | Amps | Parallel Plate | VPHB | VPHB-G |
|---|---|---|---|---|---|
| 27 | 23 | 6.0 | 123.3 | 7.4 | 4.6 |
| 28 | 23 | 7.5 | 120.8 | 13.4 | 10.7 |
| 29 | 23 | 9.0 | 144.8 | 13.3 | 12.6 |
| 30 | 24 | 6.0 | 138.6 | 0 | 7.6 |
| 31 | 24 | 7.5 | 143.4 | 14.1 | 10.7 |
| 32 | 24 | 9.0 | 140.9 | 15.5 | 13.2 |
| 33 | 25 | 6.0 | 138.0 | 24.5 | 22.9 |
| 34 | 25 | 7.5 | 148.0 | 31.1 | 32.6 |
| 35 | 25 | 9.0 | 147.7 | 33.1 | 33.4 |
| 36 | 26 | 6.0 | 146.9 | 20.4 | 14.5 |
| 37 | 26 | 7.5 | 145.9 | 21.7 | 19.7 |
| 38 | 26 | 9.0 | 159.0 | 23.4 | 22.9 |

Example 39

A two layer coextruded precursor film was formed having an inner layer of Exxon SLP 9017 a homogeneous ethylene hexene copolymer having a density of 0.920 g/cc and a 3.0 M.I. and an outermost layer of Excorene LD 720.92 from Exxon, EVA-1.

Following irradiation the precursor film was extrusion coated with a first barrier layer of a vinylidene chloride methyl acrylate supplied by Dow, a second layer of EVA-1 and an abuse layer of LD 318.92 from Exxon, EVA-2. The film structure was then oriented out of hot water by a trapped bubble technique. The final overall structure and target percent thickness per layer was:

SLP 9017/EVA-1//Saran/EVA-1/EVA-2
14.58%   50.42%   10%   12.5%   12.5%

Example 40

The procedure set forth in Example 39 was repeated with the exception that the inner layer of the precursor film was formed of a blend of 90% by weight of Exxon SLP 9017 and 10% by weight of Exxon SLP 4008, a homogeneous ethylene hexene copolymer having a density of 0.885 g/cc and a 4 M.I.

Example 41

The procedure set forth in Example 39 was repeated with the exception that the inner layer of the precursor film was formed of a blend of 80% by weight of Exxon SLP 9017 and 20% by weight Exxon SLP 4008.

Example 42

The procedure set forth in Example 39 was repeated with the exception that the inner layer of the precursor film was formed of a blend of 70% by weight of Exxon SLP 9017 and 30% by weight of Exxon SLP 4008.

Example 43

The procedure set forth in Example 39 was repeated with the exception that the inner layer of the precursor film was formed of a blend of 60% by weight of Exxon SLP 9017 and 40% by weight of Exxon SLP 4008.

Example 44

The procedure set forth in Example 39 was repeated with the exception that the inner layer of the precursor film was formed of a blend of 90% by weight of Dowlex 2045 and 10% by weight of Exxon SLP 9013, a homogeneous ethylene hexene copolymer having a density of 0.898 g/cc and a 3.2 M.I.

Example 45

The procedure set forth in Example 39 was repeated with the exception that the inner layer of the precursor film was formed of a blend of 80% by weight of Dowlex 2045 and 20% by weight of Exxon SLP 9013.

Example 46

The procedure set forth in Example 39 was repeated with the exception that the inner layer of the precursor was formed of a blend of 70% by weight of Dowlex 2045 and 30% by weight of Exxon SLP 9013.

Example 47

The procedure set forth in Example 39 was repeated with the exception that the inner layer of the precursor film was formed of a blend of 60% by weight of Dowlex 2045 and 40% by weight of Exxon SLP 9013.

Examples 48-57

The films of Examples 39-47 and Example 26 were formed into side seal bags and were subjected to parallel plate, LRHB-G (linear ramped hot burst grease) and VPHB-G tests. Results for all three tests for each sample are given in Table VI below.

Example 57 represents test results for the film of Example 26, the closest available prior art structure.

TABLE VI

| EX # | FILM OF EX. # | PP IOWP | LRHB-P SEC | LRHB-P IOWP | VPHB-G SE | VPHB-G IOWP |
|---|---|---|---|---|---|---|
| 48 | 39 | 172 | 21 | 44 | 44 | 45 |
| 49 | 40 | 168 | 20 | 41 | 43 | 45 |
| 50 | 41 | 152 | 18 | 38 | 44 | 40 |
| 51 | 42 | 142 | 17 | 36 | 42 | 39 |
| 52 | 43 | 138 | 17 | 35 | 49 | 35 |
| 53 | 44 | 130 | 17 | 35 | 35 | 37 |
| 54 | 45 | 136 | 18 | 37 | 42 | 38 |
| 55 | 46 | 151 | 19 | 38 | 49 | 41 |
| 56 | 47 | 146 | 19 | 38 | 56 | 38 |
| 57 | 26 | 145 | 16 | 30 | 28 | 33 |

Four monolayer platens were pressed from samples of Exxon SLP 3011A, a homogeneous ethylene hexene copolymer having a density of 0.910 and a 1.0 M.I. substantially as described by the film forming process of Example 1 above.

One platen was not irradiated while the other three were irradiated to dosages of 3 MR, 4.5 MR and 7 MR respectively. Thereafter, each platen was oriented on the T.M. Long Stretcher substantially as described in the orientation procedure of Example 1 above. Each platen was oriented at 92° C. Thereafter, the resultant oriented films were measured for percent gel and instrumented impact at peak load and energy to break. The results are detailed in Table VII below.

TABLE VII

| EX # | MR | % GEL | INSTRUMENTED IMPACT Peak (lb) |
|------|-----|-------|-------------------------------|
| 58   | 0   | 0     | 38                            |
| 59   | 3   | 0     | 47                            |
| 60   | 4.5 | 32.7  | 42                            |
| 61   | 7   | 56.0  | 39                            |

Examples 62-65

Four monolayer platens were pressed from samples of Exxon SLP 3011D by the procedure set forth above for Examples 58-61. However, each platen was oriented at 85° C. Test results are shown in Table VIII below.

TABLE VIII

| EX # | MR | % GEL | INSTRUMENTED IMPACT Peak (lb) |
|------|-----|-------|-------------------------------|
| 62   | 0   | 0     | 40                            |
| 63   | 3   | 0     | 39                            |
| 64   | 4.5 | 23.2  | 42                            |
| 65   | 7   | 56.0  | 47                            |

Examples 66-73

The films of Examples 58-65 above were tested to determine tensile strength elongation and modulus in both the transverse and longitudinal directions. The results are given in Table IX below.

TABLE IX

| Ex # | Film of Ex. # | Tensile (psi) L/T | Elongation (%) L/T | Modulus × 1000 (psi) L/T |
|------|---------------|-------------------|--------------------|--------------------------|
| 66   | 58            | 15400/19500       | 115/215            | 21.9/29.5                |
| 67   | 59            | 17300/17700       | 120/200            | 24.7/17.5                |
| 68   | 60            | 16200/20400       | 105/270            | 24.9/27.0                |
| 69   | 61            | 23500/16000       | 150/150            | 17.2/28.8                |
| 70   | 62            | 14800/15000       | 160/210            | 11.1/15.5                |
| 71   | 63            | 20200/10100       | 160/180            | 10.6/14.3                |
| 72   | 64            | 17500/12200       | 140/180            | 13.3/8.4                 |
| 73   | 65            | 15000/13000       | 140/190            | 10.3/12.7                |

Example 74

A two layer coextruded precursor film was formed having an inner layer of LD 318.92 from Exxon, EVA-1, and a second layer of Exxon SLP 3010D, a homogeneous ethylene butene copolymer having a density of 0.902 and a 1.0 M.I. The precursor film was irradiated at a dosage of 4.5 MR.

Thereafter, the precursor film was extrusion coated with a barrier layer of a vinylidene chloride methyl acrylate supplied by Dow, and then a layer of EP 4062-3 an ethylene vinyl acetate having 15% vinyl acetate EVA-2 and an abuse layer of EVA-1.

The total structure was oriented out of hot water with a preheat temperature of 195° C. and a hot bath temperature of 188° C. The resultant oriented film had a structure and percent thickness per layer as follows:

| A     | B   | C     | B   | A     |
|-------|-----|-------|-----|-------|
| 16.7% | 25% | 16.7% | 25% | 16.7% |

Example 75

The procedure set forth in Example 74 was repeated with the exception that the total structure was oriented out of hot water with a preheat temperature of 188° C. and a hot bath temperature of 181° C.

Example 76

The procedure set forth in Example 74 was repeated with the exception that the second layer of the precursor film was Exxon SLP 3011D and the total structure was oriented out of hot water with a preheat temperature of 188° C. and a hot bath temperature of 181° C.

Examples 77-79

The films made by the procedures of Examples 74-76 above were tested for instrumented impact at peak load and energy to break as well as free shrink at 195° F. in both the longitudinal and transverse directions. The results of these tests are given in Table X below.

TABLE X

| Ex. # | Film of Ex. # | Instrumented Impact Peak | Free Shrink L | Free Shrink T |
|-------|---------------|--------------------------|---------------|---------------|
| 77    | 74            | 68.1                     | 51            | 63            |
| 78    | 75            | 66.3                     | 51            | 63            |
| 79    | 76            | 86.4                     | 45            | 56            |

Example 80

A palindromic five layer coextruded film having an A/B/C/B/A structure was oriented out of hot air at 115° C. The skin layers A were each 100% of Exxon SLP 9017, a homogeneous ethylene hexene copolymer having a density of 0.920 g/cc. The internal layers B were each 100% of Dowlex 2045, a heterogeneous ethylene octene copolymer having a density of 0.920 g/cc, supplied by Dow. The core layer C was 100% of PE 1335, an ethylene vinyl acetate having 3.3% vinyl acetate supplied by Rexene. The percent thicknesses of the layers were as follows:

| EVA-1/SLP 3010D//Saran/EVA-2/EVA-1 | | | | |
|--------|--------|------|--------|------|
| 14.29% | 51.43% | 9.80 | 16.33% | 8.16 |

Example 81

A palindromic three layer coextruded film having an A/B/A structure was oriented out of hot air at 113° C. The skin layers A were a blend of 25% by weight of Exxon 3011D, a homogeneous ethylene hexene copolymer having a 0.902 g/cc density, 25% by weight of Dowlex 2037, a heterogeneous ethylene octene copolymer having a density of 0.935 g/cc supplied by Dow, and 50% by weight of Dowlex 2045. The percent thickness of the layers were as follows:

| A/ | B/ | A |
|---|---|---|
| 25% | 50% | 25% |

The oriented film had excellent optical properties. However, the slip properties were poor.

Example 82

The procedure of Example 81 was repeated with the exception that the SLP 3011D of the skin layer was replaced with Exxon SLP 3011A, a homogeneous ethylene hexene copolymer having a density of 0.910 g/cc. Here again, the present oriented film had excellent optical properties.

Example 83

The procedure of Example 81 was repeated with the exception that the skin layers A were a blend of 84% by weight of Exxon SLP 0233, a homogeneous ethylene hexene copolymer having a density of 0.922 and 16% by weight of Attane 4202, a heterogeneous ethylene octene copolymer having a density of 0.912 g/cc.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A heat-shrinkable film comprising a homogeneous linear single site catalyzed copolymer of ethylene and an alpha-olefin having from three to ten carbon atoms, the copolymer having a density above 0.90 g/cc, and a total free shrink at 195° F. of 101 to 114 percent, and an instrumented impact strength of 66.3 to 86.4 pounds.

2. A heat-shrinkable film according to claim 1 wherein the linear single site catalyzed copolymer is a copolymer of ethylene and an alpha-olefin having from six to ten carbon atoms.

3. A heat-shrinkable film comprising a homogeneous linear copolymer of ethylene and an alpha-olefin having from six to ten carbon atoms, the copolymer having a density above 0.90 g/cc, the film having an instrumented impact strength of 31 to 65 pounds per mil, and a free shrink at 200° F. of 38 to 55 percent in each direction.

4. The heat-shrinkable film according to claim 3, wherein the instrumented impact strength is 60 to 65 pounds per mil.

5. The heat-shrinkable film according to claim 3, wherein the film has a total free shrink at 200° F. of 81 to 108 percent.

6. The heat-shrinkable film according to claim 3, wherein the film has a total free shrink at 200° F. of 81 to 98 percent.

7. The heat-shrinkable film according to claim 3, wherein the homogeneous linear copolymer has a density of at least 0.902 g/cm$^3$.

8. A heat shrinkable film comprising five layers, said film comprising:
an inner layer,
a core layer comprising a homogeneous linear copolymer of ethylene and an alpha-olefin having from six to eight carbon atoms, said copolymer having a density of above 0.90 g/cc,
an adhesive layer,
a barrier layer, and
an outer abuse layer,
wherein at least one layer of said film is irradiated, wherein the film has an instrumented impact value of 56.4 to 86.8 lbs.

9. The heat shrinkable film according to claim 8, wherein the homogeneous linear copolymer has a density of from 0.902 to 0.922 g/cm$^3$.

10. A heat-shrinkable film comprising a homogeneous linear, single site catalyzed copolymer of ethylene and an alpha-olefin having from three to ten carbon atoms, the copolymer having a density above 0.90 g/cc, the film having an instrumented impact strength of 66.3 to 86.4 pounds and a free shrink at 195° F. of 45 to 63 percent in each direction.

11. A heat shrinkable film comprising at least two layers, wherein at least one of said layers comprises a homogeneous linear single site catalyzed copolymer of ethylene and an alpha-olefin having from three to ten carbon atoms, said copolymer having a density above 0.90 g/cm$^3$, the film comprising at least 51.43% of said homogeneous linear copolymer, said film having a free shrink at 195° F. of 45 to 63% in each of the longitudinal and transverse directions, wherein the film has an instrumented impact strength of from 66.3 to 86.4 pounds.

12. The film according to claim 11, wherein the copolymer has a density of 0.902 to 0.922 g/cm$^3$.

* * * * *